(12) United States Patent
Hubbard

(10) Patent No.: US 6,182,391 B1
(45) Date of Patent: Feb. 6, 2001

(54) FISHING LURE

(76) Inventor: Steven M. Hubbard, 9502 Petite La., Lakeside, CA (US) 92040

(*) Notice: Under 35 U.S.C. 154(b), the term of this patent shall be extended for 0 days.

(21) Appl. No.: 09/017,030

(22) Filed: Feb. 2, 1998

Related U.S. Application Data

(60) Provisional application No. 60/037,824, filed on Feb. 5, 1997, and provisional application No. 60/052,405, filed on Jul. 14, 1997.

(51) Int. Cl.[7] .................................................. A01K 85/00
(52) U.S. Cl. ...................... 43/42.33; 43/42.34; 43/42.32
(58) Field of Search ............................. 43/42.33, 42.32, 43/42.34

(56) References Cited

U.S. PATENT DOCUMENTS

| | | | |
|---|---|---|---|
| 2,350,572 | * 6/1944 | Schweigert | 43/42.33 |
| 2,596,883 | * 5/1952 | Wise | 43/42.33 |
| 3,494,065 | * 2/1970 | Benttinen | 43/42.33 |
| 3,528,189 | 9/1970 | Lilley, Jr. | 43/42.33 |
| 3,611,614 | * 10/1971 | Ward | 43/42.33 |
| 4,307,531 | 12/1981 | Honse | 43/42.32 |
| 4,429,482 | 2/1984 | Honse | 43/42.32 |
| 4,631,854 | * 12/1986 | Rosko | 43/42.33 |
| 4,790,101 | 12/1988 | Craddock | 43/42.37 |
| 4,912,871 | * 4/1990 | Brady | 43/42.33 |
| 5,077,930 | * 1/1992 | Berry | 43/42.32 |
| 5,564,220 | * 10/1996 | Blicha | 43/42.33 |

OTHER PUBLICATIONS

Fishing Article On Soft Plastic Mar. 1997 Steve Quinn In Fisherman Magazine pp. 79–85 Lures Titled "A Renaissance In Soft Plastics For Bass".

* cited by examiner

*Primary Examiner*—Michael J. Carone
*Assistant Examiner*—Fredrick T. French, III

(57) ABSTRACT

A fishing lure made of soft flexible material. The various shapes of the lure resemble fish, bait, squid, lizards, crayfish, jig trailers, swimbaits, reapers, jerk baits, and other shapes. The tail portion of the fish shaped lure normally has a paddle type tail, which when pulled through the water moves horizontally from side to side, imitating the swimming action of fish. These fish lures are often called swimbaits or paddle tails. The lure has a piece of reflective foil, larger than the size of glitter common to prior art, placed on the surface of the lure or within the lure. The reflective strip normally has a holographic design pattern, such as fish scales or other patterns.

19 Claims, 32 Drawing Sheets

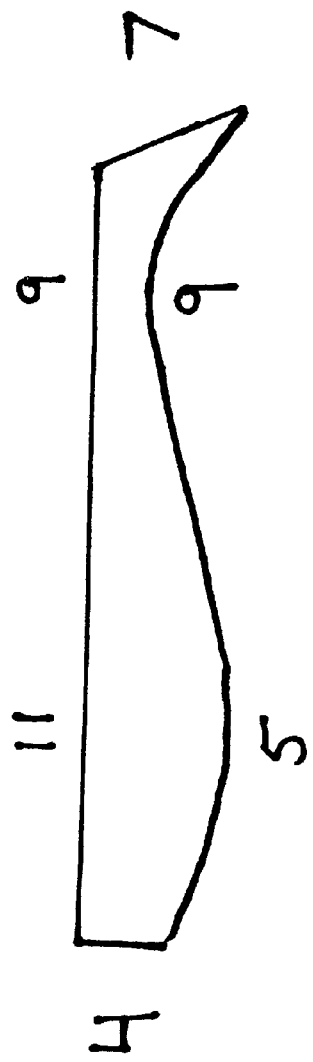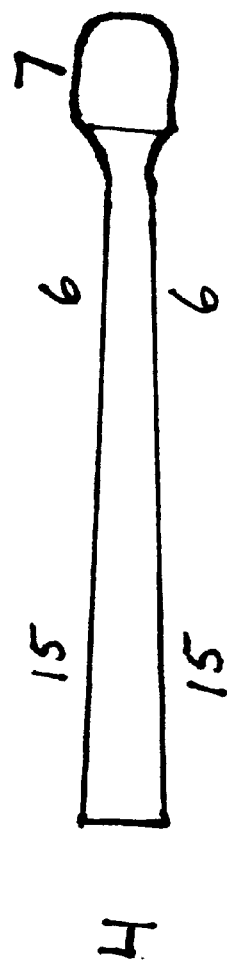

270  270

281  281

280

365              365

366   366

FISHING LURE

CROSS REFERENCE TO RELATED APPLICATIONS

This patent application is a non-provisional patent application and claims the filing dates of provisional patent applications 60/037,824 field Feb. 5, 1997 and 60/052,405 filed Jul. 14, 1997.

BACKGROUND OF THE INVENTION

This invention relates to fishing, specifically to soft flexible fishing lures.

BACKGROUND—DISCUSSION OF PRIOR ART

Fish primarily feed on living or dead organisms, called bait, such as smaller fish. Lures are used to catch fish by mimicking bait in shape, size, smell, sound, appearance and action. It is a well known fact that the closer the action and appearance of the lure is to the actual bait it is imitating, the more fish the lure will catch. The lures that catch the most fish are most popular for obvious reasons. If fishing pressure is severe, fish can become "accustomed" to lures over a period of time and tend not to bit the same lure as aggressively as when the lure was first marketed. The fishing lure industry is constantly refining and improving fishing lures to better mimic the shape, size, smell, sound, appearance, color and action of bait in order to allow the fishermen to be successful in his pursuits. Sight and appearance play an important role, if not the most important role, in fish feeding habits, and fishermen are constantly seeking better methods of attracting fish by means of the lure's appearance. One of the main areas of emphasis in recent years has been creating hard plastic lures with better reflective characteristics and better fish imitating paint designs. This is achieved by using metallic paints or placing reflective foil inside the hollow hard plastic bodies. Placing reflective foil inside hard plastic lures has been around since at least 1968. U.S. Pat. No. 3,528,189 is an example of such. However, soft plastic lures have seen virtually no advance in reflective improvements since glitter was introduced many years ago.

In prior art, glitter was interspersed into soft bodied lures to achieve reflection of light in the lure in order to imitate the brilliant reflection of the scales and skin of fish. The largest glitter size I have seen used is 0.040 of an inch, although glitter is available in sizes to ⅛ of an inch. However, glitter does not come close to imitating the brilliant reflection of the skin and scales in many fish, nor match the reflective ability of other lures such as hard plastic lures or metal lures. The reflection of light from a fish's skin and scales is of a specific area of a fish, normally the broad side and belly of the fish. In prior art, glitter is interspersed in the plastic, and accordingly does not have the surface reflective area to match the amount of reflection from fish's skin and scales. The reflection from a fish is not limited to sparkles here and there as is the case with glitter, but is normally a wide area covering the entire side or belly of the fish. Any person who has seen baitfish knows the brilliant reflection the baitfish give off as they swim and turn in the water. Additionally, particles of glitter do not all face the same direction since they are randomly interspersed in the lure, and thus the total surface area of the glitter that can reflect in a particular direction is much less than if the glitter all faced in one direction. Additionally, the use of glitter to achieve reflection prevents the use of "pattern" such as fish scales or other patterns to be reflected in the lure.

A search was made of all patents under classification 43/17.6, 43/42.24, 43/42.25, 43/42.26, 43/42.27, 43/42.28, 43/42.29, 43/42.32, 43/42.33 and 43/42.34. U.S. Pat. Nos. 4,307,531 and 4,429,482 were the closest patents to the present invention. However, these patents are not similar to the present invention. Subsequently, U.S. Pat. No. 4,429,482 has lapsed. The lures described in these patents do not appear to have ever been marketed. They are not for sale in any mail order catalogs that I am aware of, nor have I seen them in fishing tackle stores or advertisements. The lure described in these patents is an extremely thin lure and appears designed "to be used as the substitute for prepared whole natural bait fish or bait fish parts, or decorations attached to fishing lures". The patent also states "It requires little or no preparation prior to rigging with hooks, lines, weights or other articles used by those knowledgeable in the art of bait rigging". Emphasis added. The emphasis on this lure appears to be replacing a dead or live fish on your hook with the inventor's lure. The patents do not cite any configuration similar to the configurations of my invention. Additionally, the idea of placing the reflective foil onto the surface or imbedded into soft flexible lures is not mentioned in these patents.

U.S. Pat. No. 4,307,531 states "The preferred structure comprises outer sheets of transparent plastic material with a thin, shiny sheet, with an embossed surface of numerous scale simulating facets for the reflection of light, positioned between the outer transparent plastic members. The plastic members are integrated in any suitable fashion such as with an adhesive, heat-sealing, stitching, etc." Emphasis added. The use of the word "sheets" combined with the drawings shown this lure to be extremely thin, with no substantive body. The reflective foil is normally produced at ⅔₁₀₀₀ of an inch thick. The drawings show the "outer sheets" to be of the same thickness. This shows how narrow this lure is, and not representative of classic soft flexible lures. The lure in U.S. Pat. No. 4,307,531 bears no resemblance to the soft flexible lures on the market today. No soft flexible lure is shaped so thin. In fact, the fish shaped lure described in U.S. Pat. No. 4,307,531 is merely a die cut of the reflective foils that have been used for quite some time. The Witchcraft Company has been die cutting and selling the reflective foils with a PVC or polyester coating since approximately 1974, well before U.S. Pat. No. 4,307,531 was filed. U.S. Pat. No. 4,307,531 is simply a die cut of reflective foil which is then attached on the end of a hook.

The whole process of making the lure described in FIG. 3 is completely different than that of making soft flexible lures which are hand poured or injection molded. U.S. Pat. No. 4,307,531 states "Although the structure in FIGS. 1 through 5 consists of three separate layers, it is obvious that the structure may include additional outer transparent plastic layers". From this statement it shows the inventor's idea is a lure of thin layers or "sheets" of clear plastic, sandwiched around the reflective foil. Indeed, U.S. Pat. No. 4,307,531 states "The preferred structure comprises outer sheets of transparent plastic material with a thin, shiny sheet, with an embossed surface of numerous scale simulating facets for the reflection of light, positioned between the outer transparent plastic members. The plastic members are integrated in any suitable fashion such as with an adhesive, heat-sealing, stitching, etc.". The word "sheets" is a description for a thin PVC or polyester laminate placed on either side of the reflective foil. This in no way is related to the present invention of imbedding the reflective foil into classical soft flexible lures or applying the reflective foil onto the surface of soft bodied plastic lures. Soft flexible lures are not made of "sheets" of plastic. Rather, they are injection molded or hand poured from liquid plastisol into a mold cavity. As previously mentioned, the Witchcraft Company has been making a reflective foil with a thin PVC laminate since 1974 and die cutting the material to requested shapes, including fish patterns.

U.S. Pat. No. 4,307,531 describes the process for making the lure which includes folding the lure. In essence there are two identical halves to this lure, which are folded at the periphery so that they mate to one another. The very fact that the lure can be folded shows that it is a very thin lure and not your typical soft flexible lure, such as a swimbait, which cannot be folded as described in U.S. Pat. No. 4,307,531. The entire process for making the lure as described in FIG. 3 is totally different than the manufacturing process of soft flexible baits, which requires the heating of plastisol and then pouring or injecting the plastisol into a lure cavity. Further, thin "sheets" of soft transparent material that are heat sealed or adhesively bonded at the periphery are not used in the making of classic soft flexible lures.

In conclusion, the author of U.S. Pat. No. 4,307,531 did not have the idea of placing the reflective foil into the body of classic soft flexible lures or of placing the reflective foil onto the surface of soft flexible lures. The author also does not identify any soft flexible lures in the patents. The lure is merely a die cut of reflective foil, which is sandwiched by thin sheets of cured PVC. Die cuts of reflective foil have been used since at least 1974. Additionally, the invention in U.S. Pat. No. 4,307,531 appears to never have been marketed. In summary, no prior art describes the insertion of reflective foil, larger than the size of glitter, into soft flexible lures or the placing of reflective foil, larger than the size of glitter, onto the surface of soft flexible lures. The author has obtained voluminous mail order fishing catalogs, including all of the largest mail order catalogs, and has not found a similar invention. The author has also attended several large fishing shows, including the American Sportfishing Association's annual expo and the Fred J. Hall Fishing Show in San Diego. No similar inventions were exhibited. Also, the author reads numerous fishing magazines and has not found the subject invention in any of the "new product" sections or described or advertised in the magazines. One magazine, called "In Fisherman", in its March 1997 issue, contained an article on "Fantastic New Plastics for Bass". Numerous state of the art soft flexible lures were pictured, including many of the body shapes in the present invention, and none contained a reflective foil placed into the body of a soft flexible lure as described in this invention nor the idea of placing the reflective foil onto the surface of a soft plastic lure.

OBJECTS AND ADVANTAGES

The objects and advantages of my invention are described as follows. Placing the reflective foil, larger than the size of glitter, onto the surface of the soft plastic lure or placing the reflective foil into a soft flexible lure, results in a much better imitation of the natural reflection of a fish's skin and scales in reflecting light. The amount of reflection is vastly greater than the reflection produced by glitter. The total surface area reflection of the reflective foil is significantly greater than the surface area reflection of glitter due to the reflective foil being comprised of one continuous plane and facing one direction, as opposed to glitter which faces many directions, does not have one continuous plane, and thus does not have the same surface area to reflect light in one direction. This greater reflection more accurately duplicates the amount of reflection from a fish's side and belly. As opposed to glitter, the reflective foil can have a pattern, such as fish scales or other patterns, to achieve different effects or a more realistic imitation of fish scales and of the iridescent reflection in fish (this includes holographic patterns). Glitter is of such small size and is not of a continuous plane with soft plastic lures, that no pattern can be seen or achieved. Reflective foil can have other colors or an image embossed, hot stamped, engraved, painted, laminated, printed or placed by any other means in or on the reflective foil in order to better duplicate colors and patterns of fish. Glitter on the other hand, cannot incorporate any pattern that is visible, due to its small particle size.

Additionally, exact colors and patterns of bait or fish, may be "painted" or "printed" into or onto the reflective foil and placed within the lure body or on the surface of the lure. This process can be done through any means. Examples include embossing, hot stamping, silk screening, holography, airbrushing, pad printing and painting. Photographs of fish or bait can be taken and then "transferred" onto the reflective foil. When the image and colors of the bait or fish is "transferred" onto reflective material such as metallized polyester film, this results in a lifelike image not previously attainable in soft flexible lures.

Hard bodied lures, such as that shown in U.S. Pat. No. 3,528,189 issued in 1968, have achieved many of the desired effects attributed to this invention. However, soft bodied lures have lagged far behind the hard bodied lures in reflection quality, and ability to duplicate the colors and patterns of fish. No one has invented a soft flexible lure with a piece of reflective foil, larger than the size of glitter, embedded in the lure or placed on the surface of the lure. The present invention dramatically advances the ability of soft flexible lures to match or exceed the hard bodied lures in reflection and duplication of a fish's colors and patterns.

Compared to prior art, the inventor believes the reflective foil or reflective "strip" provides a significant improvement in the reflection of light in a soft plastic lure, and also in the ability to place a reflective pattern into soft flexible lures, such as fish scales and other patterns. Further objects and advantages of may invention will become apparent from a consideration of the drawings and ensuing description.

BRIEF DESCRIPTION OF THE DRAWINGS

In the following disclosure, note that FIGS. 18–20, 25–27, 37, 56, 57, 60, 62, 68, 69 and 72–79 are not provided in this application.

The drawings are all rough hand drawings and are not perfectly to scale or perfect drawings. Formal drawings will be submitted later.

It is important to note that the various features of the swimbait lures shown in the figures may be combined. For instance, the swimbait tail section described in one figure may be used on a swimbait in a different figure.

In all side views in the figures, the left side of the lure is the front or nose section, the right side of the lure is the rear or tail section, the top portion is the back of the lure, and the bottom portion is the belly of the lure.

Figure 1:
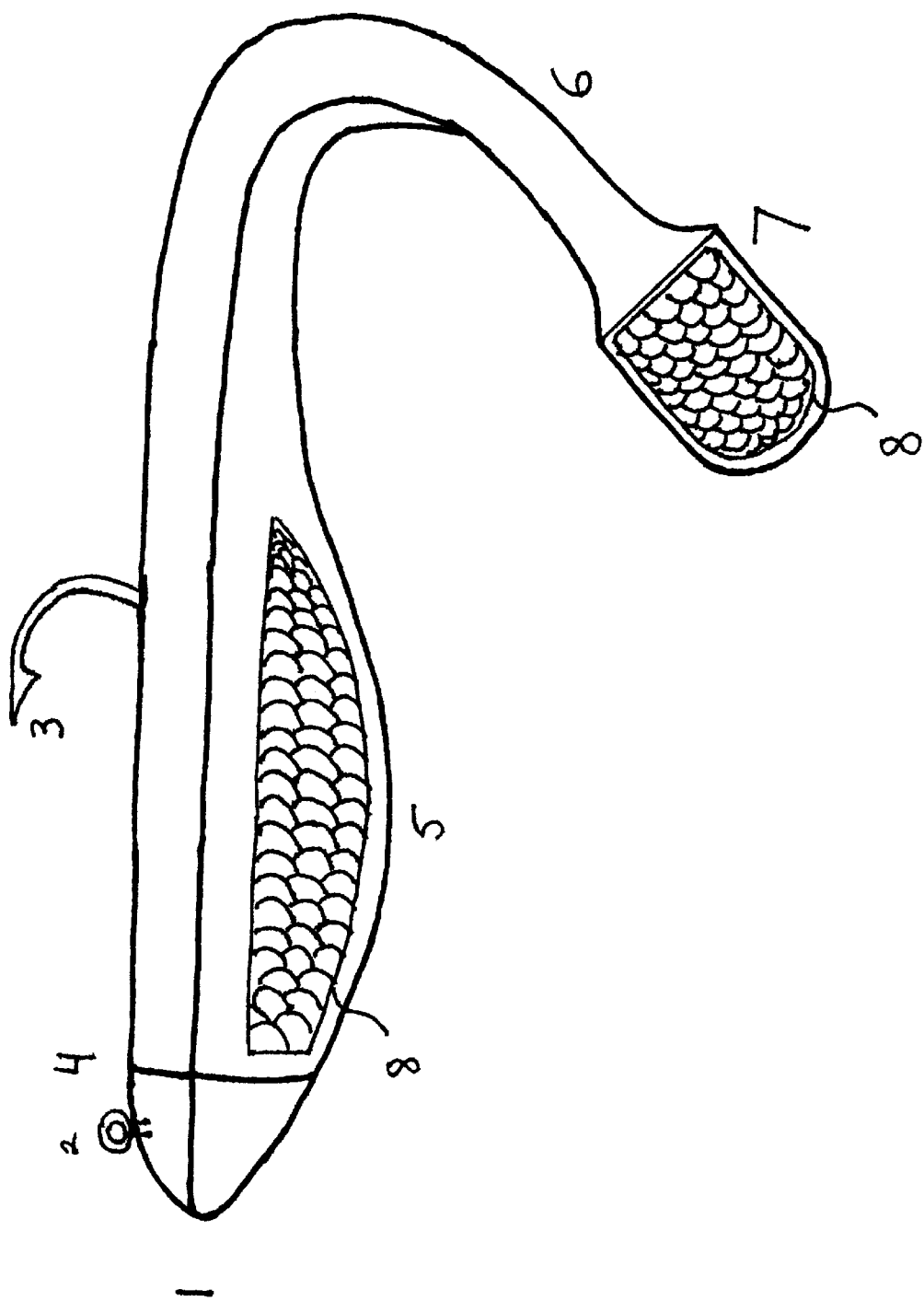

FIG. 1 is a perspective drawing of a preferred embodiment of the fishing lure in which a jighead 1, with a hookeye 2 and hook 3 protruding from the jighead, is attached to a soft flexible lure. The soft flexible lure's head or nose 4 butts up against the jighead. The belly 5 of the soft flexible lure tapers to a rear portion 6 and then to the larger tail section 7. Reflective foil(s) are placed into the lure or on the surface of the lure. The lure is called a swimbait and/or paddletail. More than one piece of reflective foil (not shown) may be placed in or on the lure. For instance, a large piece of reflective foil may be placed in or on the body of the lure and a smaller piece of reflective foil, approximately the same shape and size as the paddle tail of the lure, may be placed in or on the paddle tail section of the lure.

FIG. 2 is a side view of the soft flexible lure of FIG. 1, excluding the jighead. The top or back 11 of the lure is normally a planar surface. However, the lure can be made with a rounded back. The belly 5 tapers to a rear portion 9 of the lure and then will widen slightly at the larger tail section 7.

FIG. 3 is a top view of the lure in FIG. 2. The tail section 7 is a preferred embodiment of the tail section, often called a paddletail, but see also the tail section 20 in FIG. 4. The sides 15 of the front part of the lure taper towards the tail 7. The shape of the tail is not quite accurate as the drawing gives the appearance that the paddle tail extends away from the nose of the lure farther than it actually does.

Figure 4:
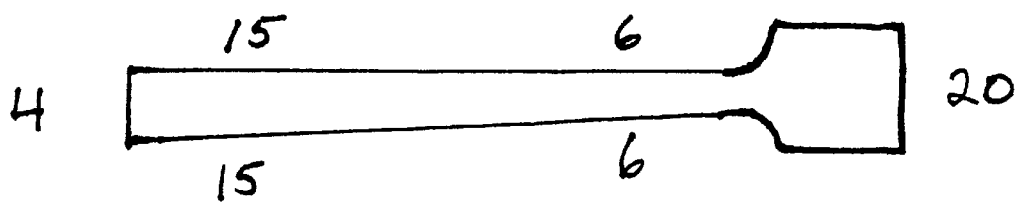

FIG. 4 is a top view of the lure in FIG. 3. The only difference between the first and second embodiments is the shape of the tail 20. This tail shape is also a preferred embodiment of the fishing lure. The shape of the tail is not quite accurate as the drawing gives the appearance that the paddle tail extends away from the nose of the lure farther than it actually does.

Figure 5:
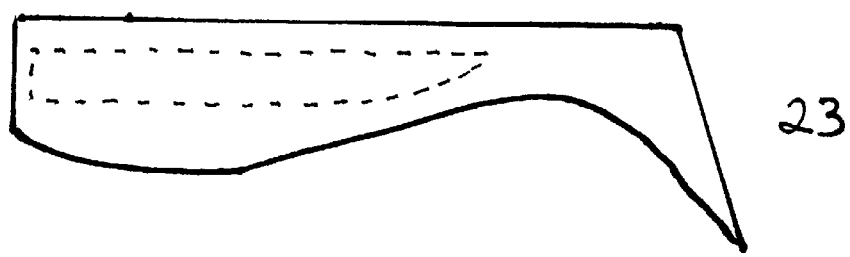

FIG. 5 is a side view of a third embodiment of the fishing lure. The tail section 23 is much bigger in this embodiment.

Figure 6:
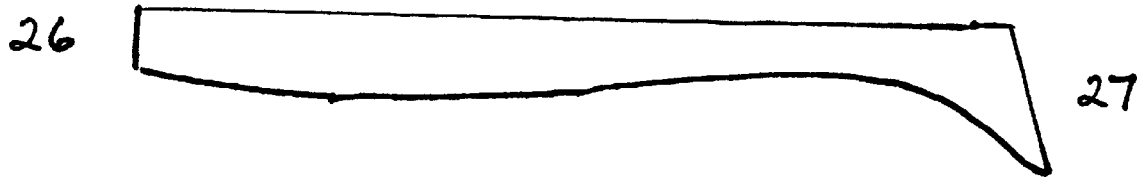

FIG. 6 is a side view of another embodiment of the fishing lure. This embodiment has a slimmer profile and does not have as large a belly as the previous embodiments.

Figure 7:
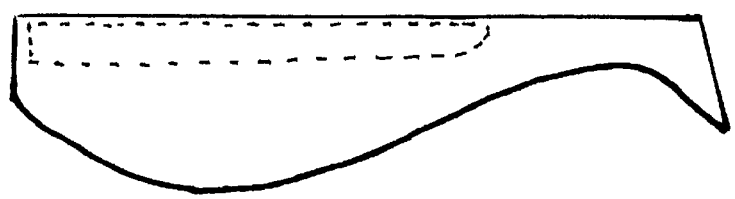

FIG. 7 is a side view of another embodiment of the fishing lure. This embodiment has a deeper belly 29 than the previous embodiments.

Figure 8:
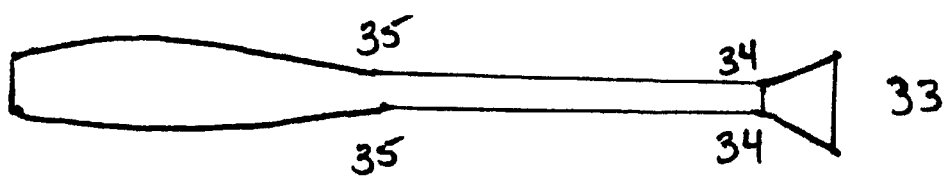

FIG. 8 is a top view of another embodiment of the fishing lure. In this embodiment, the tail section from 35 to 34 is narrower than the previous embodiments. The paddle tail 33 is a slightly different shape than previous embodiments, and is representative of some of the many tail shapes that are within the scope of this invention. The tail is usually thinner in this embodiment which allows for greater oscillation of the lure at slower retrieval speeds.

Figure 9:
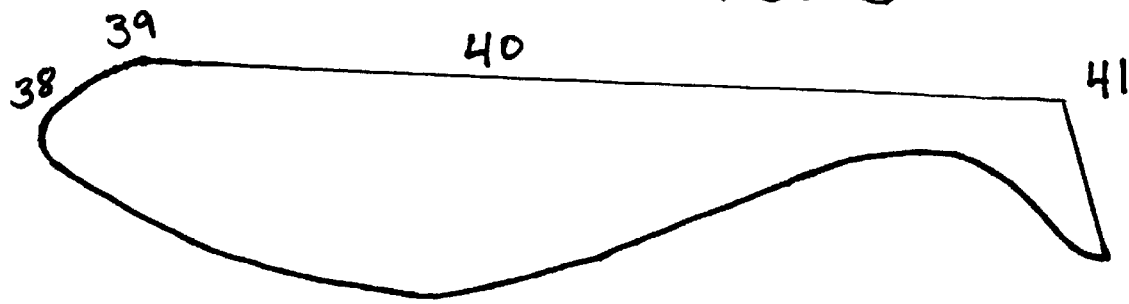

FIG. 9 is a side view of another embodiment of the fishing lure. This embodiment has a planar top or back 40. The top front of the lure 39 slopes downward as it nears the nose 38 of the lure.

Figure 10:
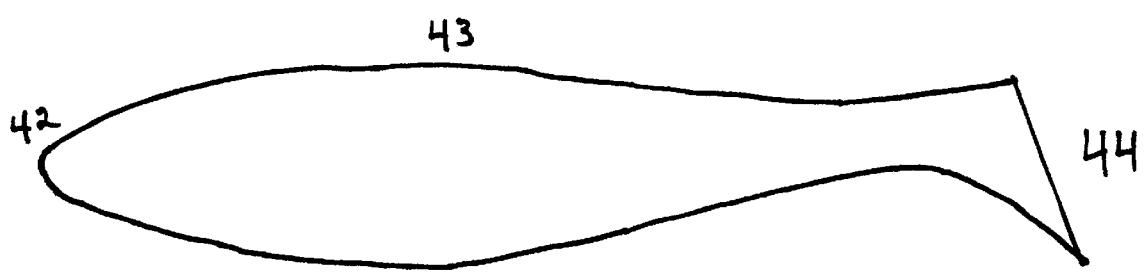

FIG. 10 is a side view of another embodiment of the fishing lure and very closely related to FIG. 9. This lure, instead of having a flat back from nose to tail as FIG. 9 does, has a curved back 43 from nose 42 to tail 44.

Figure 11:
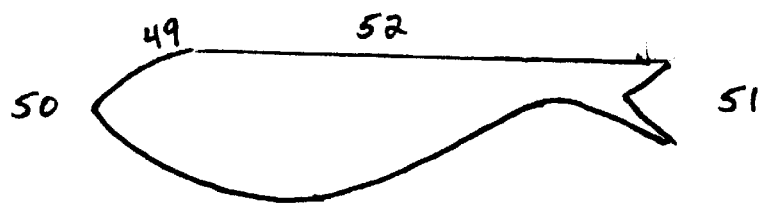
Figure 22:
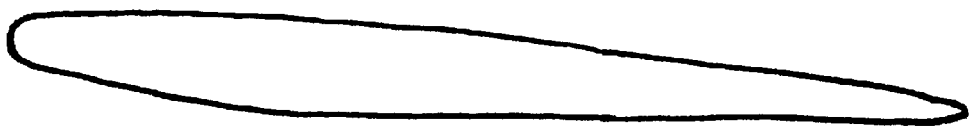

FIG. 11 is a side view of another embodiment of the fishing lure. This embodiment has a straight top or back 52 from the top front 49 of the lure to the tail 51 of the lure. The top front of the lure 49 slopes downward as it nears the nose 50 of the lure. The lure, when viewed from the top may be shaped in two different ways. In one version, the lure tapers as it nears the tail section 46 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 12:
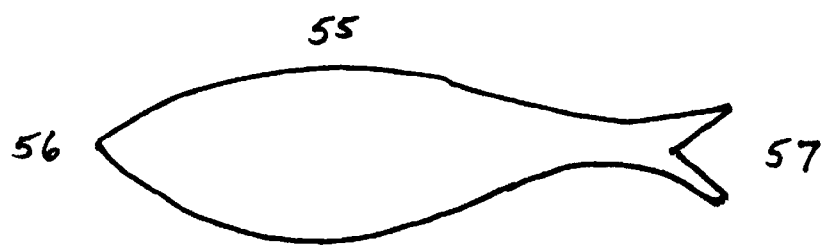

FIG. 12 is a side view of another embodiment of the fishing lure. This embodiment is very similar to the lure in FIG. 11, but has a curved back 55. The lure, when viewed from the top may be shaped in two different ways. In one version, the lure tapers as it nears the tail section 57 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 13:

FIG. 13 is another embodiment, similar to FIG. 12, but with a slimmer profile. The lure, when viewed from the top may be shaped in two different ways. In one version, the lure tapers as it nears the tail section 63 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 14:
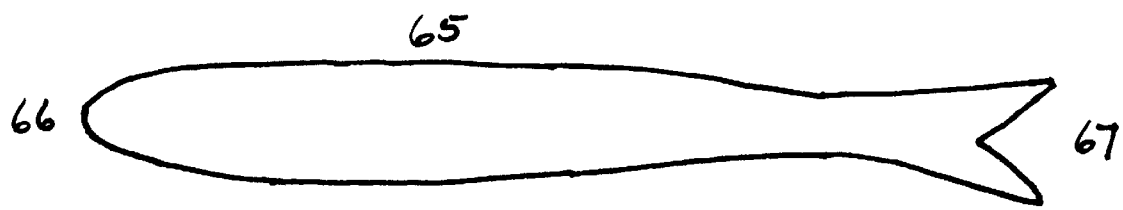

FIG. 14 is a side view of another embodiment of the fishing lure. The embodiment has a planar or semi planar top. The lure, when viewed from the top may be shaped in two different ways. In one version, the lure tapers as it nears the tail section 67 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 14A:

FIG. 14a is a side view of another embodiment of the fishing lure. This embodiment has a planar top. The lure, when viewed from the top may be shaped in two different ways. In one version, the lure tapers as it nears the tail section 68 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 15:

FIG. 15 is a side view of another embodiment of the fishing lure. This embodiment has a planar top 70. The lure, when viewed from the top may be shaped in two different ways. In one version, the lure tapers as it nears the tail section 73 when viewed from the top. FIG. 22 is representative of what the top view of this version would look like. In another version, the tail shape widens as a paddle tail lure does, when viewed from the top, and causes the tail section to oscillate like the paddle tail lures in FIGS. 1–10.

Figure 16:

FIG. 16 is a side view of another embodiment of the fishing lure. This lure is similar to FIG. 2, but with a curl tail 80 instead of a paddletail.

Figure 17:
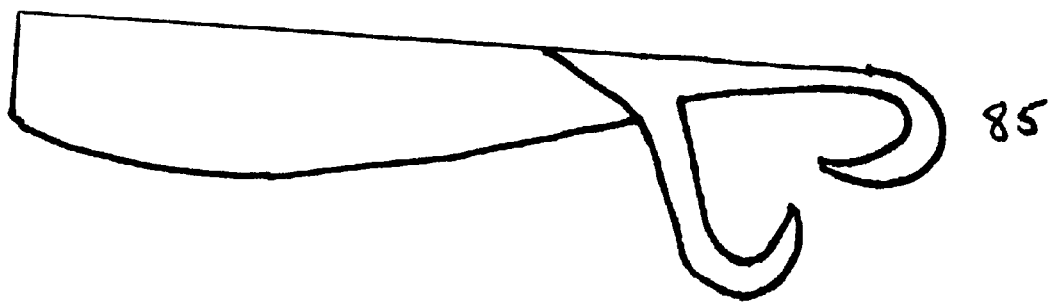

FIG. 17 is a side view of another embodiment of the fishing lure similar to FIG. 16. This lure has double curly tails 85.

Figure 20A:
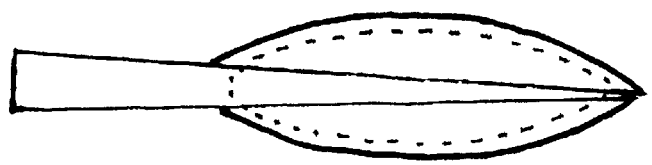

FIG. 20A is a top view of another embodiment of the fishing lure, commonly called a reaper. This lure has a wide tail that is fairly thin. The dashed line represents the shape of reflective foil placed into or onto the lure.

Figure 20B:
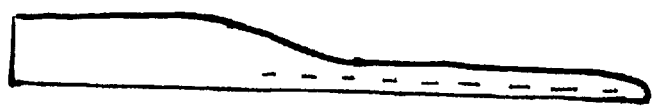

FIG. 20B is a side view of the lure in FIG. 20A.

Figure 21:
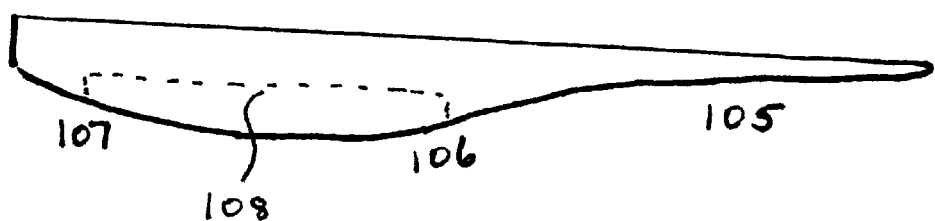

FIG. 21 is a side view of another embodiment of the fishing lure. The body tapers from the midsection 106 to a narrow tail 105. A vertical slit 108 is often placed in the belly or underside of the lure running from point 107 to 106. This slit allows for the hook to be inserted and hid in the body of the lure more easily.

FIG. 22 is a top view of the lure in FIG. 21.

Figure 23:

FIG. 23 is a top view of another embodiment for the lures in FIGS. 21 and 22. This embodiment has asymmetrical sides. A small protrusion may be placed on the straight side of the lure.

Figure 24A:
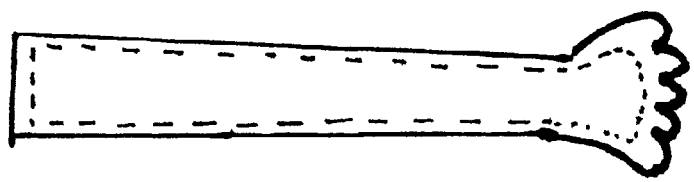

FIG. 24A is a top view of another embodiment of the fishing lure. This lure is commonly called a shrimp tail. The dashed line represents the reflective foil.

Figure 24B:

FIG. 24B is a side view of the lure in FIG. 24A.

Figure 28:
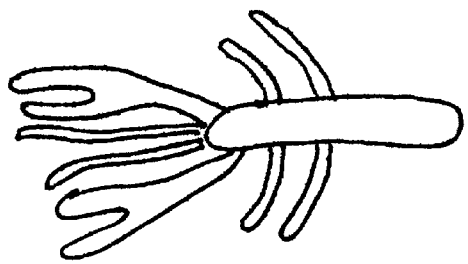

FIG. 28 is a top view of another embodiment of the fishing lure, patterned after a crawdad.

Figure 29A:
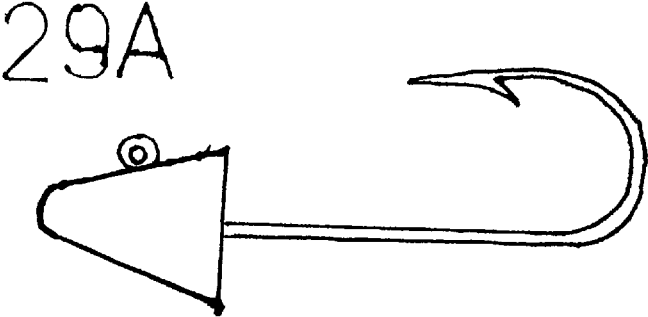

FIG. 29A is a side view of a jighead and hook.

Figure 29B:
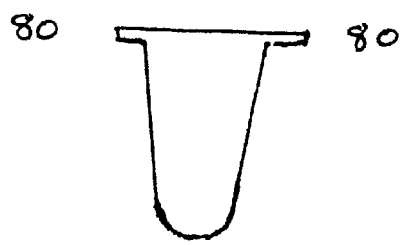

FIG. 29B is a top view of the jighead in FIG. 29A. The jighead has flanges 80 at the rear of the jighead.

Figure 29C:
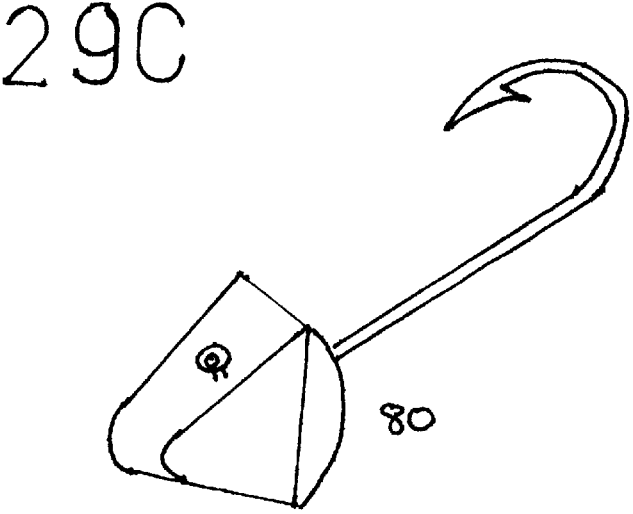

FIG. 29C is a perspective view of the jighead in FIGS. 29A and 29B. The flange 80 is shown on one side of the jighead, however, the flanges are placed on both sides of the jighead. The flanges can be of any shape. The shape shown is an oval or circular shape.

Figure 30:
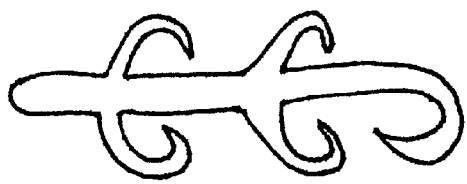

FIG. 30 is a top view of another embodiment of the fishing lure and is an imitation of a lizard. This is representative only as there are many variations to the lizard imitation.

Figure 31:
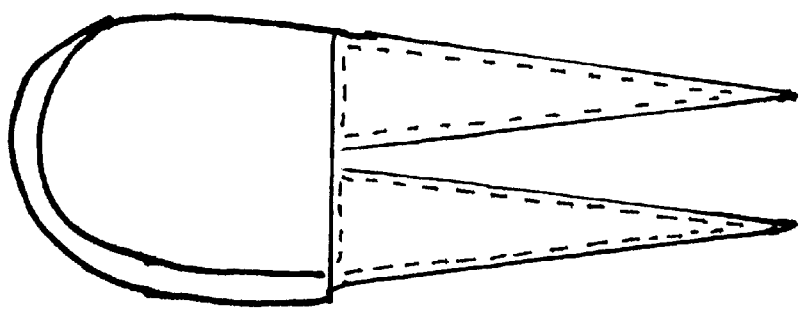

FIG. 31 is a top view of another embodiment of the fishing lure and is called a jig trailer or pork frog imitation. This figure is representative of the many variations of jig trailers.

Figure 32:
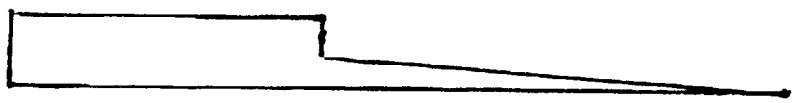

FIG. 32 is a side view of the lure in FIG. 31.

Figure 33:
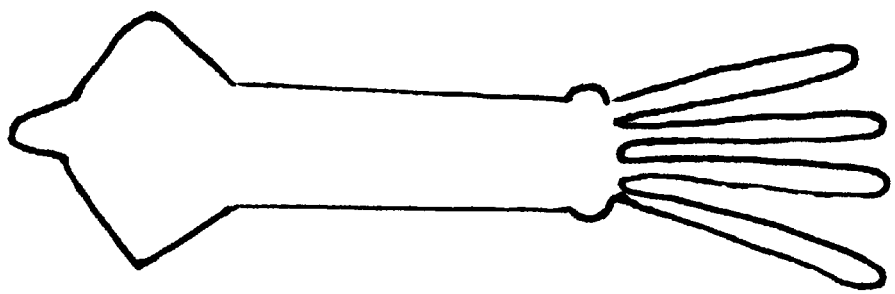

FIG. 33 is a top view another embodiment of the fishing lure and is patterned after a squid.

Figure 34:

FIG. 34 is a side view of the lure in FIG. 33.

Figure 35:
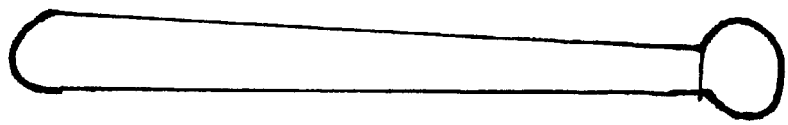

FIG. 35 is a top view of a lure very similar to FIG. 1, but with a more rounded nose.

Figure 36A:
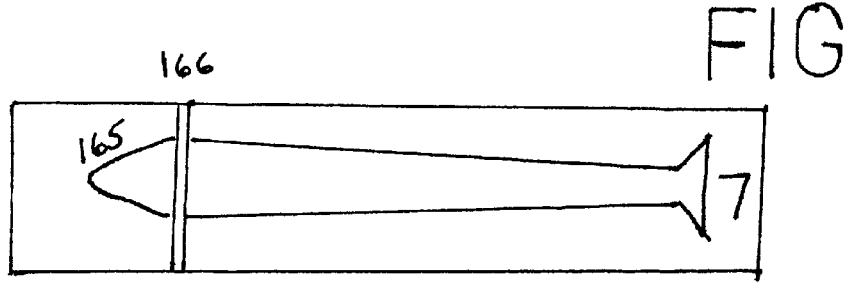

FIG. 36A is a top view of a mold with the mold cavity in the center of the mold. The front 165 is a cavity for a jighead. A thin plane 166 separates the jighead jig cavity from the cavity for the soft flexible lure. The tail 7 is shown at the opposite end of the lure.

Figure 36B:
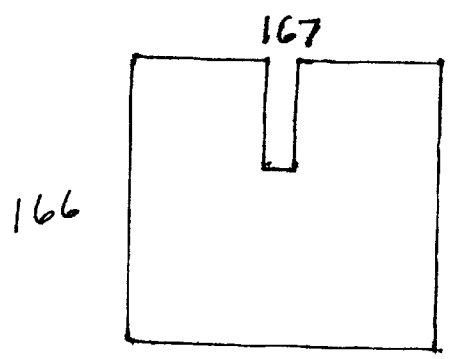

FIG. 36B is a view of the plate shown in FIG. 36A. A groove 167 is cut in the middle of the plate. The groove allows for the hook portion of the jighead to fit into the mold cavity for the soft flexible lure.

Figure 36C:
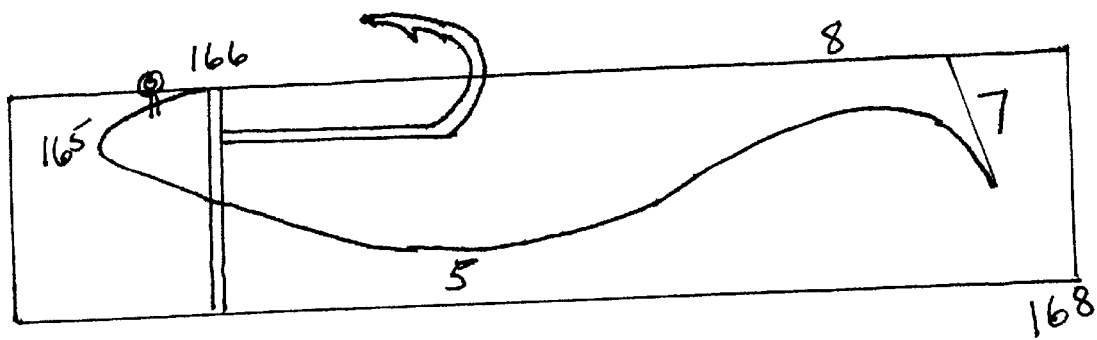

FIG. 36C is a side view of the mold cavity shown in FIG. 36A. The outside lines 168 represent the mold itself. The jighead cavity 165 is shown at the front of the lure. A plate 166 separates the jighead jig cavity from the soft flexible lure cavity.

Figure 38A:
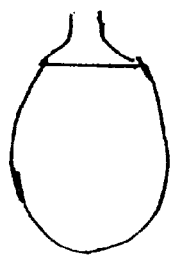
Figure 38B:
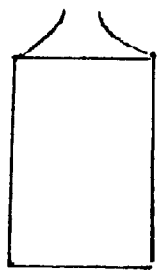
Figure 38C:
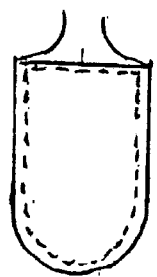
Figure 38D:
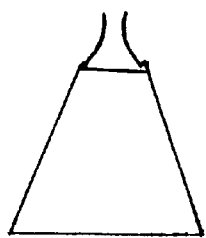
Figure 38E:
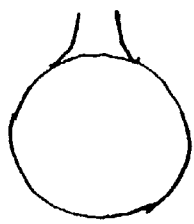
Figure 38F:
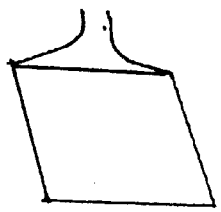
Figure 38G:
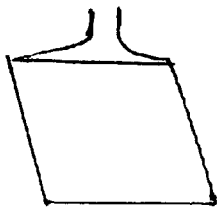
Figure 38H:
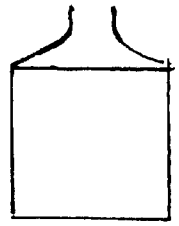
Figure 38J:

FIGS. 38A–38H and 38J are rear views of some of the possible shapes that the tails of the lures in FIGS. 1–10 can be shaped in. This is by no means an exhaustive list of all shapes possible, but is meant to give a general idea of the endless shapes the tail of the lures can take. FIG. 38C shows a dotted line which represents the shape of a piece of reflective foil placed into the tail section or on the outside surface of the tail section.

FIGS. 39A–39N and 39P–39T are front views of some of the possible shapes that the lures in the figures can be shaped in. This is by no means an exhaustive list of all shapes possible, but is meant to give a general idea of the numerous shapes the lures can take. It is important to note that the lure shape shown in FIGS. 39A–39N and 39P–39T may start off in the shape shown and then taper to any other shape. The reflective foil can be placed on any portion of the lures sides, top, tail or bottom or within the lure. Some of the embodiments have indentations in them. I only have shown the top of the indentation and not the bottom indentation, in any. Generally, the reflective foil will cover the area from the top indentation and continue to the bottom of the lure. Accordingly, no indentation is shown near the bottom of the lure. However, indentations may be placed near the bottom of the lure, or any other desirable location. Reflective foil may be placed upon any portion of the lure, not just the intended area. Also, the lure's sides may be indented in the exact shape of the reflective foil. Further, instead of being indented, the lure's sides may protrude. The protruding section would be of the same shape as the reflective foil. An example would be the foil shown on the lure in FIG. 1. This area on the side of the lure could be shaped to protrude.

Figure 39A:
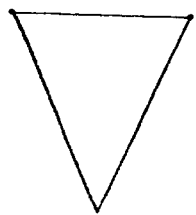

FIG. 39A is a front view of another embodiment of the lures shown in the figures, looking from the front or nose of the lure to the rear of the lure. FIG. 39A is a triangular shaped embodiment.

Figure 39B:
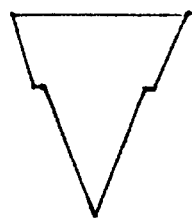

FIG. 39B is a front view of another embodiment of the lures shown in the figures, looking from the front or nose of the lure to the rear of the lure. FIG. 39B is a triangular shaped embodiment with an indentation in the sides of the lure. The reflective foil may can be placed upon any portion of the indented area. Placing the reflective foil on the indented area results in some degree in the reflective foil being on the same plane as the rest of the lure's side, and not protruding above the surface of the lure. The reflective foil may be adhesively bonded to the outside of the lure, or the reflective foil may be placed into the mold and the plastic poured into the mold.

Figure 39C:
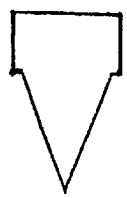

FIG. 39C is a front view of another embodiment of the lures shown in the figures, looking from the front or nose of the lure to the rear of the lure. FIG. 39C is very similar to FIG. 39B, but with the upper portion of the lure having parallel sides. FIG. 39C has indentations in the sides of the lure. The indentations allow for the reflective foil to be placed on the lure within the indented area. This results in the surface of the reflective foil generally being on the same plane as the rest of the lure's side, and not protruding above the surface of the lure.

Figure 39D:
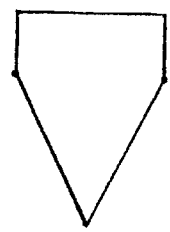

FIG. 39D is a front view of another embodiment of the lures shown in the figures, looking from the front or nose of the lure to the rear of the lure. FIG. 39D is very similar to FIG. 39C, but with no indentations.

Figure 39E:
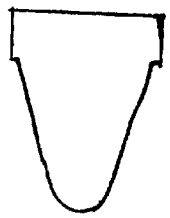

FIG. 39E is a front view of another embodiment of the lures shown in the figures, looking from the front or nose of the lure to the rear of the lure. FIG. 39E is very similar to FIG. 39C. However, the belly of the lure is rounded, rather than coming to a sharp point. FIG. 39E has indentations in the sides of the lure. The indentations allow for the reflective foil to be placed on the lure within the indented area. This results in the surface of the reflective foil generally being on the same plane as the rest of the lure's side, and not protruding above the surface of the lure. However, in this configuration, the reflective foil does not have to reach all the way to the bottom of the lure. This allows the color or glitter in the bottom of the plastic lure to show just below the reflective foil.

Figure 39F:

FIG. 39F is a front view of another embodiment of the lures shown in the figures, looking from the front or nose of the lure to the rear of the lure.

Figure 39G:
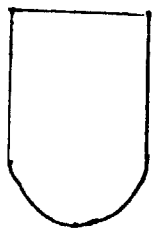

FIG. 39G is a front view of another embodiment of the lures shown in the figures, looking from the front or nose of the lure to the rear of the lure.

Figure 39H:
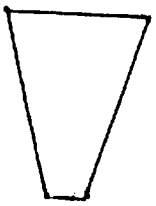

FIG. 39H is a front view of another embodiment of the lures shown in the figures, looking from the front or nose of the lure to the rear of the lure.

Figure 39I:
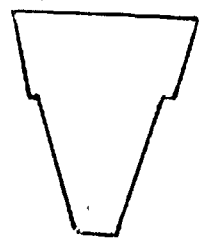

FIG. 39I is a front view of another embodiment of the lures shown in the figures, looking from the front or nose of the lure to the rear of the lure. This configuration is very similar to FIG. 39H, but with indentations in the sides of the lure.

Figure 39J:
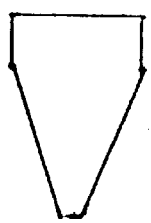

FIG. 39J is a front view of another embodiment of the lures shown in the figures, looking from the front or nose of the lure to the rear of the lure. This configuration is very similar to FIG. 39H, but with parallel sides near the top of the lure.

Figure 39K:
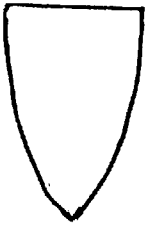

FIG. 39K is a front view of another embodiment of the lures shown in the figures, looking from the front or nose of the lure to the rear of the lure. This configuration is very similar to FIG. 39J, but with a rounded belly.

Figure 39L:
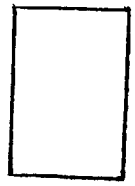

FIG. 39L is a front view of another embodiment of the lures shown in the figures, looking from the front or nose of the lure to the rear of the lure.

Figure 39M:
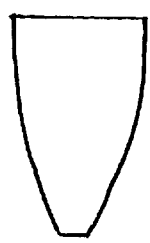

FIG. 39M is a front view of another embodiment of the lures shown in the figures, looking from the front or nose of the lure to the rear of the lure.

Figure 39N:
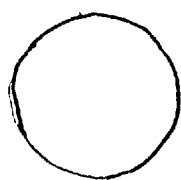

FIG. 39N is a front view of another embodiment of the lures shown in the figures, looking from the front or nose of the lure to the rear of the lure.

Figure 39P:

FIG. 39P is a front view of another embodiment of the lures shown in the figures, looking from the front or nose of the lure to the rear of the lure.

Figure 39Q:
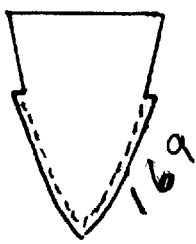

FIG. 39Q is a front view of another embodiment of the lures shown in the figures, looking from the front or nose of the lure to the rear of the lure. This embodiment has a protruding area 169. The protruding area is representative only, since the protruding area will vary with the desired shape and placement of the reflective foil. Reflective foil is shown by the dashed lines inside the lure.

Figure 39R:
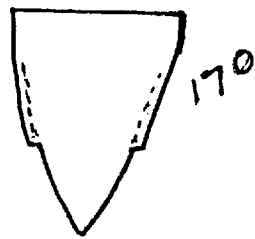

FIG. 39R is a front view of another embodiment of the lures shown in the figures, looking from the front or nose of the lure to the rear of the lure. This embodiment has a protruding area 170. The protruding area is representative only, since the protruding area will vary with the desired shape and placement of the reflective foil. Reflective foil is shown by the dashed lines inside the lure.

Figure 39S:
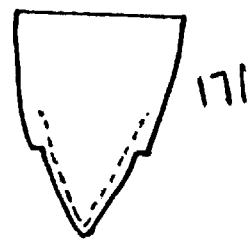

FIG. 39S is a front view of another embodiment of the lures shown in the figures, looking from the front or nose of the lure to the rear of the lure. This embodiment has a protruding area 171. The protruding area is representative only, since the protruding area will vary with the desired shape and placement of the reflective foil. Reflective foil is shown by the dashed line inside the lure. In this embodiment, the shape of the lure allows some plastic to be between the reflective foil and the outside surface of the lure.

Figure 39T:
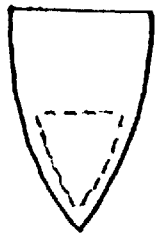

FIG. 39T is a front view of another embodiment of the lures shown in the figures, looking from the front or nose of the lure to the rear of the lure. Within the lure is a dashed line which represents a finished smaller lure with reflective foil on its sides, placed inside the larger lure.

Figure 40:
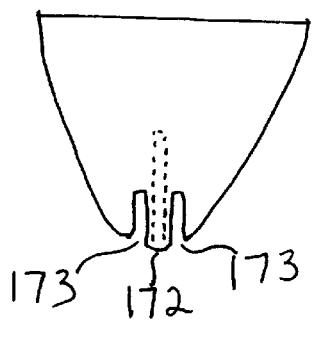
Figure 81:
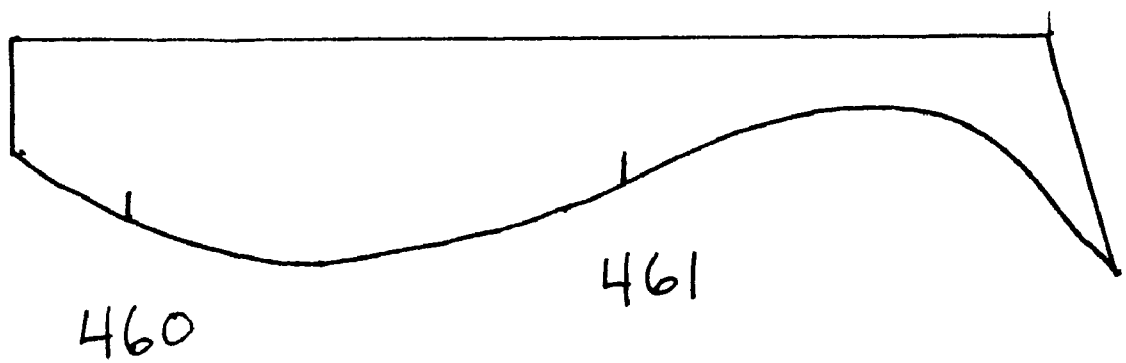

FIG. 40 is a front view of another embodiment of the lure in FIG. 2, looking from the front or nose of the lure to the rear of the lure. The bottom of the mold has two protrusions 173 that rise vertically from the bottom of the mold cavity. These protrusions may run any length of the lure. The protrusions may also be placed at any desired points within the lure. For example, a pair of protrusions may be placed near the front of the lure and another pair of protrusions placed at the midsection of the lure. The points 460, 461 of FIG. 81 are preferred placements of the protrusions. The reflective foil 172 is placed between the protrusions. The protrusions serve to hold the reflective foil 172 in place within the mold cavity and keep it from toppling over.

Figure 41:
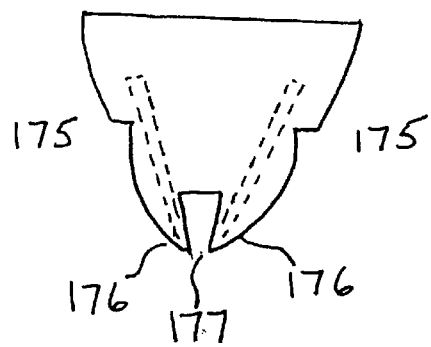

FIG. 41 is a front view of another embodiment of the lure in FIG. 2, looking from the front or nose of the lure to the rear of the lure. The bottom of the mold has a protrusion or protrusions 177 that rise vertically from the bottom of the mold cavity. The protrusion may be any shape or height. The protrusion may run any length of the lure. The protrusion may also be placed at particular points within the lure. For example, a protrusion may be placed near the front of the lure and another protrusion placed at the midsection of the lure. FIG. 81 shows two preferred placements of the protrusions. The protrusions serve to keep the reflective foil 176 in place within the mold cavity and keep them from toppling over. Note the protrusion 177 widens near the top of the protrusion when compared with the protrusion 185 in FIG. 42. The protrusion in FIG. 41 will tend to better prevent the reflective foil from toppling toward the other side of the lure when compared with the protrusion in FIG. 42. These protrusions are merely examples of some of the shapes that the protrusions may take. For example, the protrusion 177 in FIG. 41 may be made even wider near the top to better keep the reflective foil in a desired position. The lure may have two or more other protrusions or nodes 175 on the sides of the lure. These nodes serve to keep the reflective foil in an approximate desired position and also to keep the reflective foil from falling against the side of the mold cavity and thus exposing the reflective foil to the outside of the lure. The nodes 175 may run continuously any length of the lure and be placed at any location on the sides of the lure, or be placed at particular points along the lure.

Figure 42:
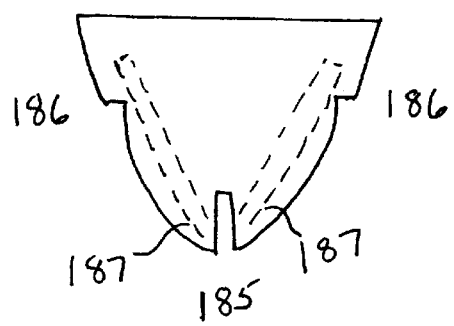
Figure 80:
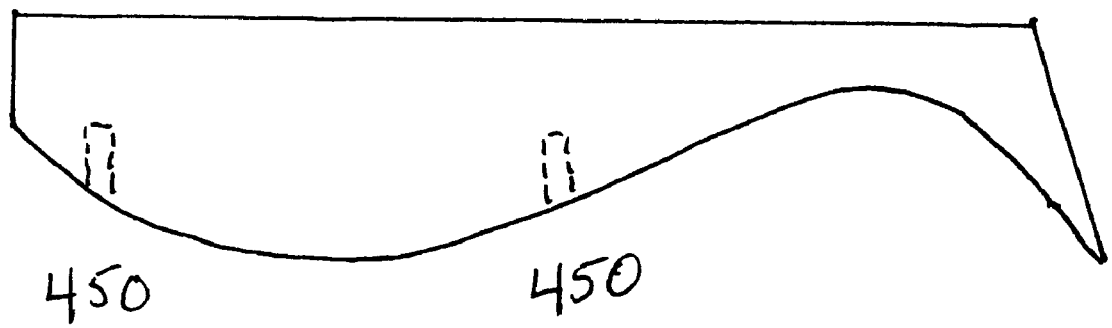

FIG. 42 is a front view of another embodiment of the lure in FIG. 1, looking from the front or nose of the lure to the rear of the lure. The bottom of the mold has a protrusion 185 that rises vertically from the bottom of the mold cavity. The protrusion may be of any shape, height or length. This protrusion may run continuously any length of the lure and any height of the lure. When the protrusion runs continuously along the bottom or belly of the lure, the protrusion is called a slit. The protrusion may also be placed at particular points within the lure such as shown in FIG. 80. For example, a protrusion may be placed near the front of the lure and another protrusion placed at the midsection of the lure. The protrusion of the mold cause the lure to be made in such a way as to keep the reflective foil 187 in a desired position within the mold cavity and keep them from toppling over. The protrusion or slit may run any length of the lure, however a preferred length of the slit is shown in FIG. 81. FIG. 81 shows a side view of the subject and shows two points along the belly of the lure 460, 461. These two points represent the approximate preferred slit distance. Regarding FIG. 42, the mold may have two or more other protrusions or nodes 186 on the sides of the lure. These nodes cause the lure shape to keep the reflective foil in an approximate desired position and also to keep the reflective foil from falling against the side of the mold cavity and thus exposing the reflective foil to the outside of the lure. The nodes 186 may run any length of the lure, be placed at any location on the sides of the lure or be placed at particular points along the lure. A preferred placement of nodes at particular points is the reference points 12 in FIG. 2.

Figure 43:
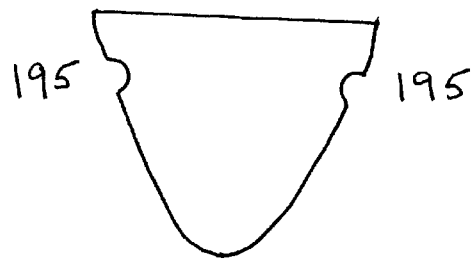

FIG. 43 is a front view of another embodiment of the lure in FIG. 1, looking from the front or nose of the lure to the rear of the lure. Protrusions or nodes 195 are shown which are different in shape than the nodes shown in FIG. 40–42. The nodes in FIG. 43 are representative of the many possible node shapes that could be used, and are just another shape within the scope of the present invention.

Figure 44:
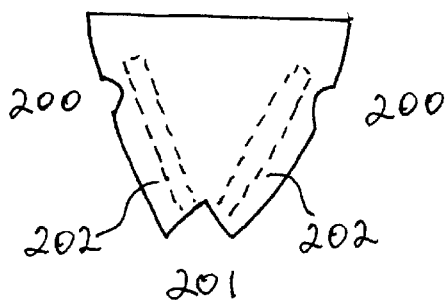

FIG. 44 is a front view of another embodiment of the lure in FIG. 1, looking from the front or nose of the lure to the rear of the lure. The bottom of the mold has a protrusion 201 that rises vertically from the bottom of the mold cavity. This protrusion may run any length of the lure. The protrusion may also be placed at particular points within the lure. For example, a protrusion may be placed near the front of the lure and another protrusion placed at the midsection of the lure. The protrusions serve to keep the reflective foils 202 in place within the mold cavity and keep them from toppling over. The lure has two or more other protrusions or nodes 200 on the sides of the lure. These nodes serve to keep the reflective foil in an approximate desired position and also to keep the reflective foil from falling against the side of the mold cavity and thus exposing the reflective foil to the outside of the lure. The nodes 200 may run any length of the lure, be placed at any location on the sides of the lure or be placed at particular points along the lure. An example of placing the nodes at particular points is shown at reference points 260 in FIG. 61.

Figure 45:
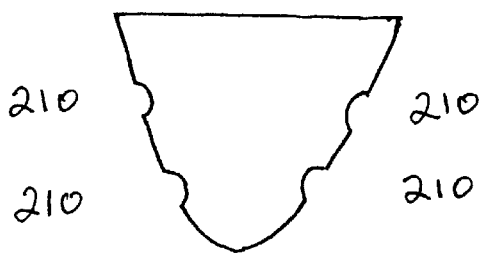

FIG. 45 is a front view of another embodiment of the lure in FIG. 1, looking from the front or nose of the lure to the rear of the lure. Protrusions or nodes 210 are shown. This Figure shows that the nodes may be placed at more than one location on the sides of the lure.

Figure 46:
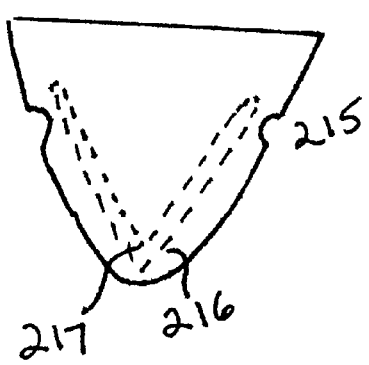

FIG. 46 is a front view of another embodiment of the lure in FIG. 1, looking from the front or nose of the lure to the rear of the lure. Protrusions or nodes 215 are shown. An insert 216 is also shown. This insert is of one piece of material and has a score or cut 217 at the bottom of the V shape. This allows the reflective foil to be more easily folded over and placed within the mold cavity. Nodes 215 may be shaped into the lure which keep the reflective foil from falling against the side of the mode cavity and thus exposing the reflective foil to the outside of the lure, rather than the reflective foil being encapsulated within the lure.

Figure 47:
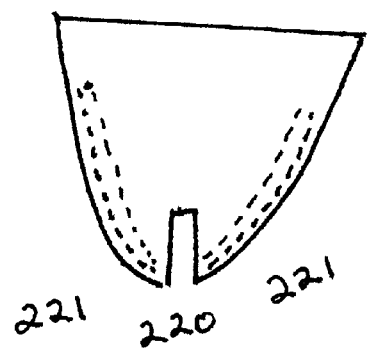

FIG. 47 is a front view of another embodiment of the lure in FIG. 1, looking from the front or nose of the lure to the rear of the lure. The mold cavity has a protrusion 220 sticking up from the bottom of the lure. The protrusion may be of any height or thickness or shape. The purpose of the protrusion is to keep the reflective foils from falling over within the lure cavity and/or to separate the reflective foils. Reflective foils 221 are placed within the lure. No nodes are placed on this embodiment which allows for the reflective foils to fall against the sides of the lure cavity and thus the reflective foil is very close to the surface of the lures side or on the outside of the lure.

Figure 48:
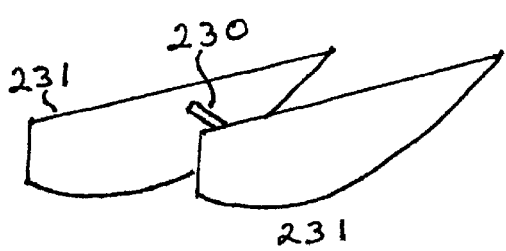
Figure 71:

FIG. 48 is a ¾ view of a form that can be placed inside the mold cavity. This form, when viewed from the side, would take the form of whatever insert shape will be used. The preferred insert shape when viewed from the side of the lure is shown in FIG. 71. The form would have two sides 231 joined by a connector 230. The form has an adhesively backed reflective foil applied to both of the outward sides of the form. The form can be of any diameter as long as it will fit within the lure cavity of the mold. Preferably, the form would come close to the edge of the lure cavity so as to position the reflective foil close to the surface of the lure itself, or the form's sides. The closer the reflective foil is to the surface of the lure, the greater the reflection the reflective foil will produce. After the form is placed into the lure cavity, the plastisol is poured around the form and the lure is now cast. The form may have flanges, similar to the flanges 241 shown in FIG. 49, to balance the form within the cavity. The form can be made of any suitable material. Examples include plastisol, metals, various plastics, etc.

Figure 49:
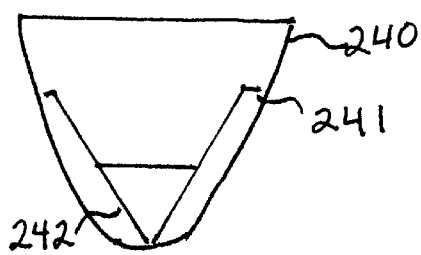

FIG. 49 is a front view of another embodiment of the lure shown in FIG. 2 with an example of the form shown in FIG. 48 placed inside the lure. The form 242 may have flanges 241 which serve the purpose of balancing the form within the lure cavity.

Figure 50:
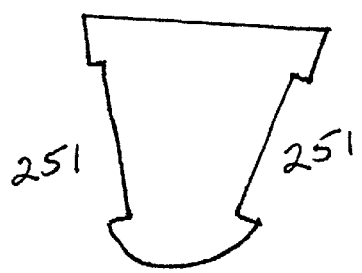

FIG. 50 is a front view of another embodiment of the lure shown in FIG. 2. The lure is shaped with an indentation 251 that matches the shape of the reflective foil. The reflective foil material is placed in the indented area 251 on the outside sides and/or tail of the lure. The reflective foil can be fixed into place by any suitable means. Examples include heat sealing, adhesion, strapping, etc.

Figure 51:
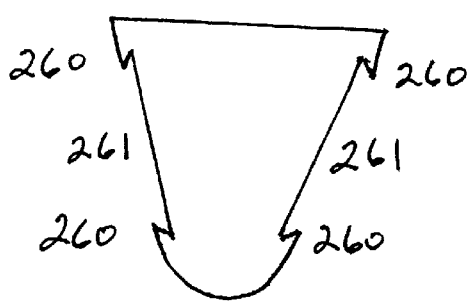

FIG. 51 is a front view of another embodiment of the lure shown in FIG. 2. The lure is shaped with an indentation 261 that matches the shape of the reflective foil. Notches 260 are made in the sides of the lure. The reflective foil material is placed along the side of the lure in the indented area 261. The shape of the indented area and notches serves to hold the reflective foil in a desired position. The reflective foil is on the outside of the lure in this embodiment. The holding of the reflective foil in place can be done by any means, including heat sealing, adhesion, strapping, etc. The notches in this embodiment are optional.

Figure 52:
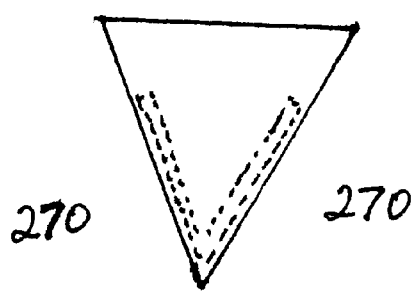

FIG. 52 is a front view of another embodiment of the lure in FIG. 2, looking from the front or nose of the lure to the rear of the lure. The lure is similar to FIG. 46. However, a slightly different shape is employed, namely a triangular shape. Nodes are not shown, but may be place on the lure. The reflective foil can be placed on the outside surface of the lure. This can be done through any means, including heat sealing, adhesion, strapping, etc. The reflective foils 270 represented by the dashed lines, can be placed into the lure and positioned at or near the sides of the lure. This method, results in the reflective foil being just underneath the surface of the lure. This method results in good reflection since the reflective foil is near surface of the lure. It is important to note that all of the lure shapes, and not just this particular Figure, when viewed from the front of the lure to the rear of the lure, may start out in the shape shown and taper to another shape. The reflective foil may also be placed onto the sides of the lure after the lure has been formed. This results in greater reflection as the reflective foil is on the outside of the lure and does not have any plastisol between it and the light source. This method, putting the reflective foil onto the surface of the lure can be done through any suitable means, including heat sealing, adhesion, strapping, etc.

Figure 53:
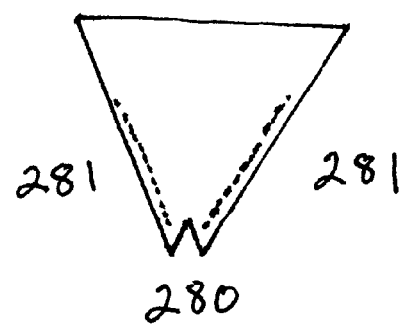

FIG. 53 is a front view of another embodiment of the lure in FIG. 2, looking from the front or nose of the lure to the rear of the lure. The lure is similar to FIG. 52. However, a protrusion 280 is shown at the bottom or belly of the lure. The protrusion helps keep the reflective foils in a desired position along the sides of the lure. The reflective foils 281 represented by the dashed lines, are placed along the sides of the lure. This method results in the reflective foil being just underneath the surface of the lure. This method results in good reflection since the reflective foil is near the surface of the lure.

Figure 54:
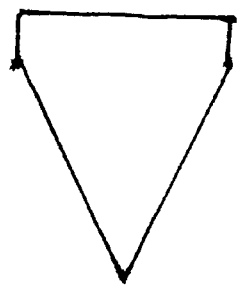

FIG. 54 is a front view of another embodiment of the lure in FIG. 2, looking from the front or nose of the lure to the rear of the lure. The shapes of the lure described in FIG. 2 may vary significantly and this embodiment is simply another shape the lure may take.

Figure 55:
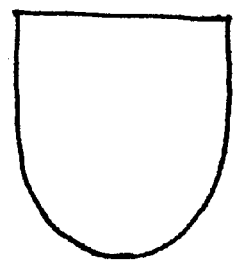

FIG. 55 is a front view of another embodiment of the lure in FIG. 2, looking from the front or nose of the lure to the rear of the lure. The shapes of the lure described in FIG. 2 may vary significantly and this embodiment is simply another shape the lure may take.

Figure 58:
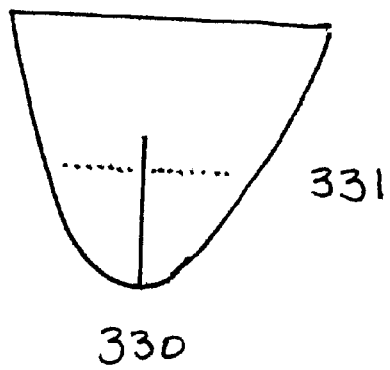

FIG. 58 is a front view of another embodiment of the lure in FIG. 2, looking from the front or nose of the lure to the rear of the lure. The lure has reflective foil 330 placed in the lure. The reflective foil has a hole or holes punched in the reflective foil which allows for a small piece of rigid or semi-rigid material 331, similar in shape to a toothpick, to be placed through the hole. The rigid or semi-rigid material serves to keep the reflective foil from falling over within the lure cavity.

Figure 59:
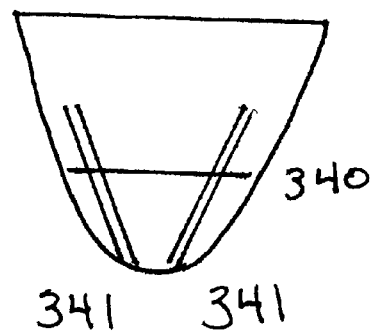

FIG. 59 is a front view of another embodiment of the lure in FIG. 2, looking from the front or nose of the lure to the rear of the lure. The lure has reflective foils 341 placed in the lure. The reflective foils have a hole or holes in the reflective foil which allows for a small piece of rigid or semi-rigid material 380 to be placed through the hole. The rigid or semi-rigid material serves to keep the reflective foil from falling over within the lure cavity.

Figure 61A:
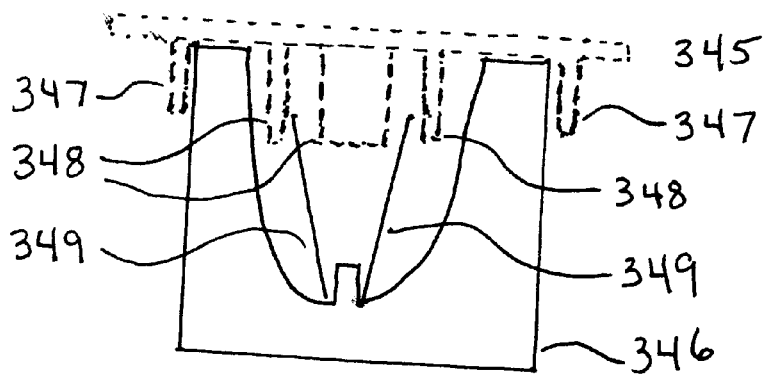

FIG. 61A is a front cut out view of the mold and mold cavity looking from the front of the lure to the rear of the lure. In this example two reflective foils 349 are placed within the mold cavity and kept in place by a bracket 345. The bracket has arms 348 that keep the reflective foil in a desired position. The bracket may also have arms 347 or other means for keeping the bracket stable on the mold. The plastisol is poured into the mold and then the bracket is removed before the plastisol cures. The bracket can be made of any suitable material.

Figure 61B:
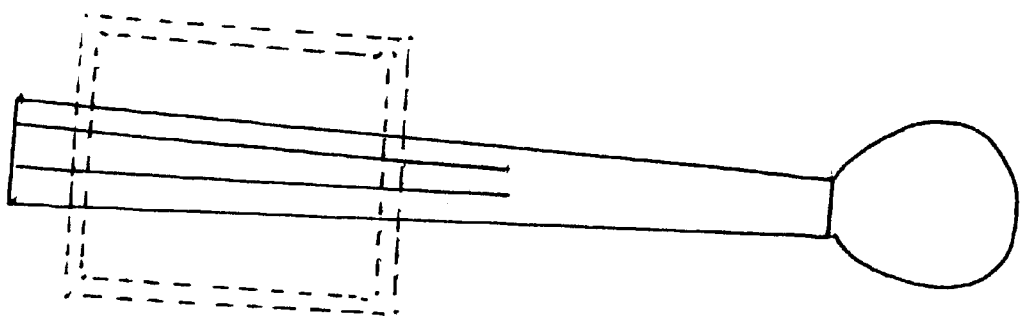

FIG. 61B is a top view of the bracket in FIG. 61A. The arms shown in FIG. 61A, would be located at the two points where the bracket crosses the mold in FIG. 61B. The bracket can have one or more points where it crosses the mold. This is only one example since the bracket may take any of numerous forms so long as it fulfills its objective as a means for keeping the reflective foil in a desired position within the lure.

Figure 61C:
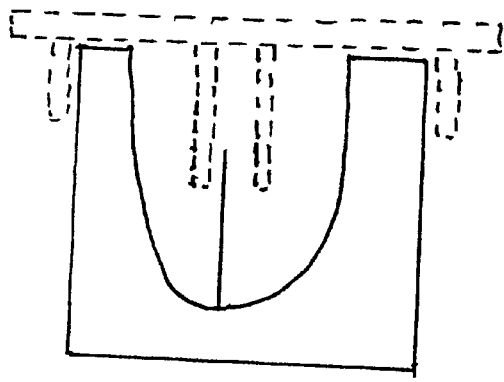

FIG. 61C is similar to FIG. 61A and is an example of a bracket when only one reflective foil is placed in the body section of the lure.

Figure 61D:
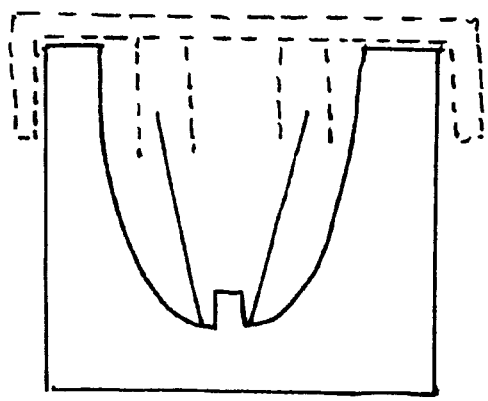

FIG. 61D is similar to FIG. 61A and is an example of another bracket shape when two reflective foils are placed within the lure.

Figure 61E:
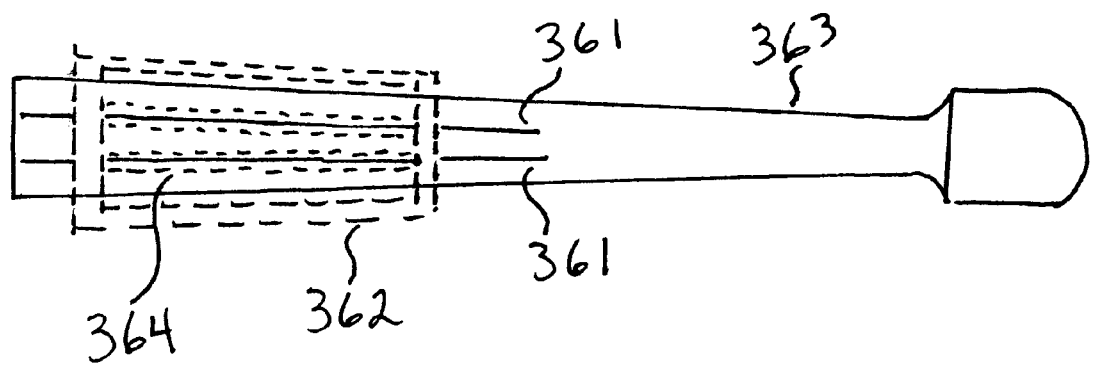

FIG. 61E is similar to FIG. 61B and is a top view of another bracket shape 362 when two reflective foils 361 are placed within the mold cavity 363. In this bracket, the arms 364 run the length of the bracket.

Figure 61F:
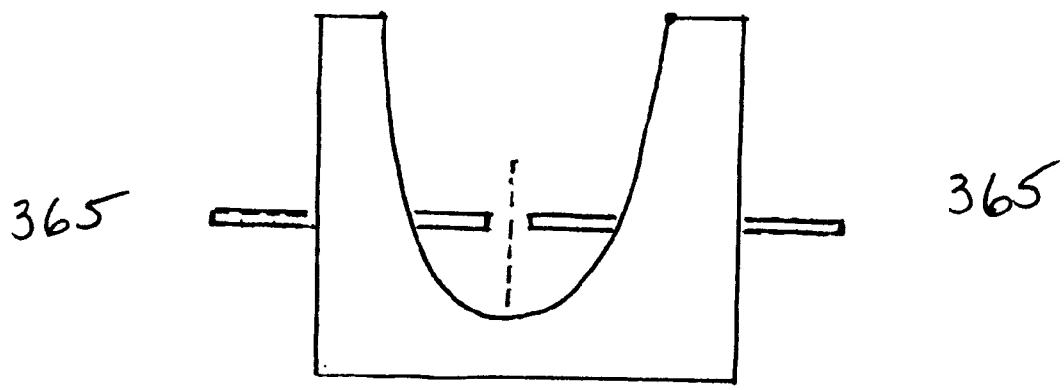

FIG. 61F is a front view of the mold and mold cavity. Reflective foil is shown by the dashed line in the middle of the lure. Pins 365 are shown that can be moved in and out of the mold cavity. The pins are used to hold the reflective foil in place. After the plastisol is poured into the mold, but before it cures, the pins are pulled out to the outside edge of the mold cavity.

Figure 61G:
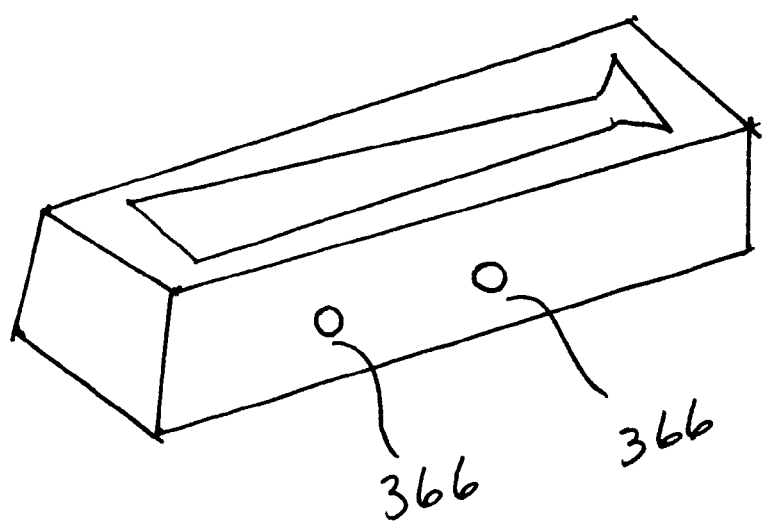

FIG. 61G is a perspective view of a mold showing two holes 366 where pins can be placed into and pushed into the mold cavity as described in FIG. 61F.

Figure 63:
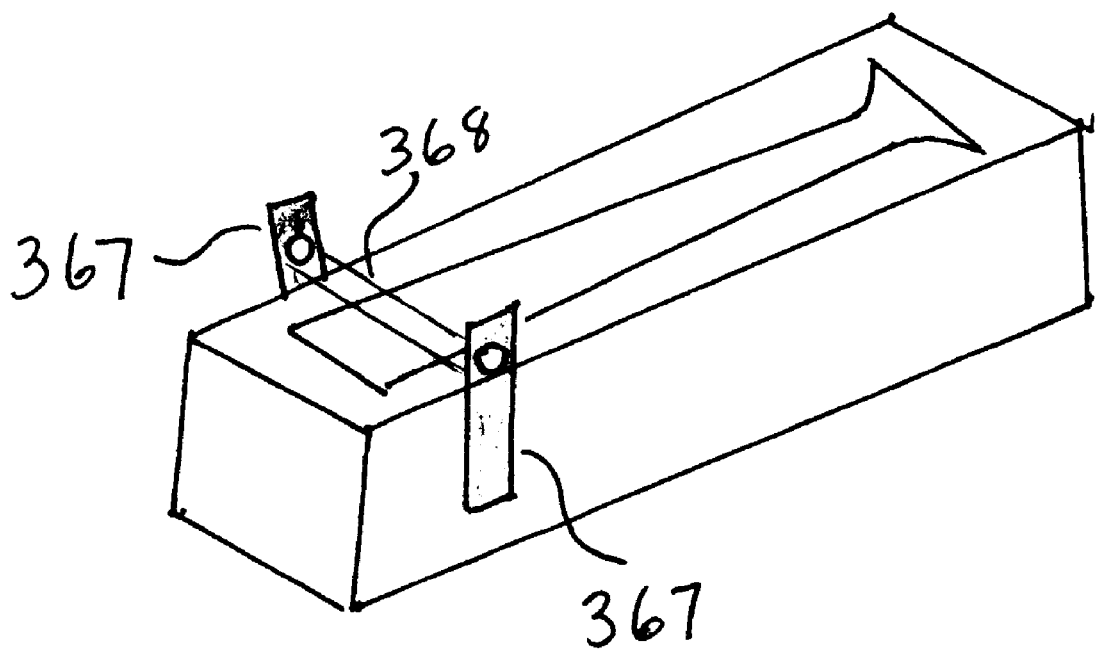

FIG. 63 is a mold of a paddle tail swimbait, such as the paddle tail shown in FIG. 1. Arms 367 can be attached to the mold. Holes can be made in the arms which allow for a pin 368, wire, or similar structure to be run from one arm to the other. The pin then rests on top of the mold cavity or slightly above the mold cavity. A jighead jig, weight, hook, or other object can be suspended from the pin, through any means, so that it rests in a desired position within the lure cavity. The plastisol is poured around the jighead jig, weight or hook. The plastisol then cures and encapsulates the jighead jig, weight or hook within the lure. Note that multiple arms and pins can be placed along the mold to support more than one point of an object or multiple objects. For instance, one pin may be placed through the eye of the hook of a jighead jig, and another pin may be placed to support another part of the hook.

Figure 63A:
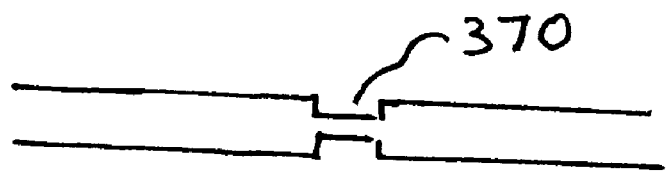

FIG. 63A is an embodiment of the pin 368 of FIG. 63. In this embodiment, the pin has a notch 370 placed in it to better hold the hook, weight or jighead jig. Preferably, the item being suspended from the pin is suspended from the notched section of the pin. This method keeps the hook, weight or jighead jig from sliding on the pin when the mold is tilted during pouring of the plastisol.

Figure 64:
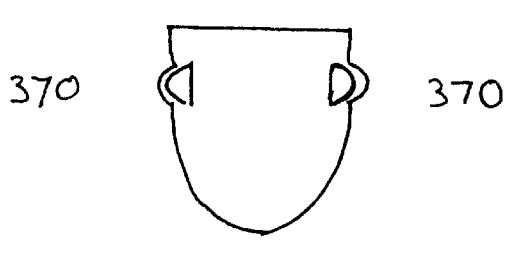

FIG. 64 is another shape of a swimbait. In this embodiment, eyes 371 protrude from the lure. When making this embodiment, three dimensional eyes can be placed in the eye sockets of the mold cavity and then the plastisol poured into the mold. The eyes then stick out slight from the surface of the rest of the lure and give a realistic look to the lure. The cured plastisol around the three dimensional eyes and the shape of the eyes, being wider inside the lure, serves to keep the eyes from falling out of the lure. The eyes, when viewed from the side of the lure, would be placed in an appropriate place for the eyes.

Figure 65:
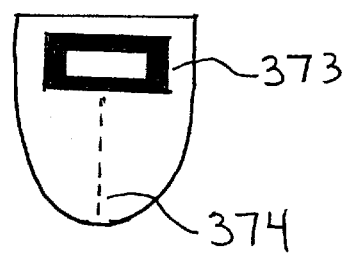

FIG. 65 is a similar embodiment as FIG. 64. In this embodiment, a weight 373 is placed within the lure. The weight would have to be placed in the lure by a method similar to that described in FIG. 63. The reflective foil 374 is shown within the lure. This methodology allows the hook to be placed above the insert and through the middle of the weight.

Figure 66:
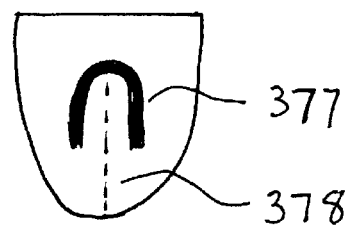

FIG. 66 is a similar embodiment as FIG. 64. In this embodiment, a weight 377 is placed within the lure. The weight would have to be placed in the lure by a method similar to that described in FIG. 63. The reflective foil 378 is shown within the lure. This methodology allows the hook to be placed above the insert and weight.

Figure 67A:
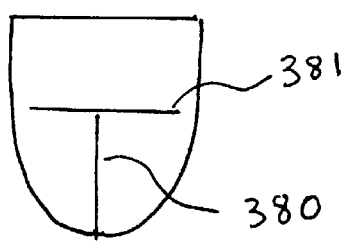

FIG. 67A is a view looking at the front of the lure. Reflective foil is placed within the lure. The reflective foil has nubs placed along the top of the reflective foil which are increased towards the side of the lure. When the reflective foil is placed into the mold cavity, the nubs serve to keep the foil from falling over within the mold cavity.

Figure 67B:
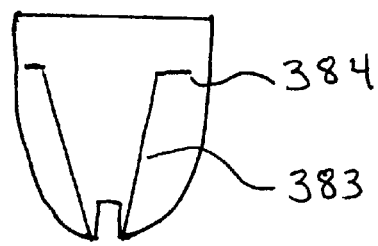

FIG. 67B is a view looking at the front of the lure. Reflective foils 383 are placed within the lure. The reflective foils have numbs 384 placed along the top of the reflective foil which are creased towards the side of the lure. When the reflective foil is placed into the mold cavity, the nubs serve to keep the foil from falling over within the mold cavity.

Figure 67C:
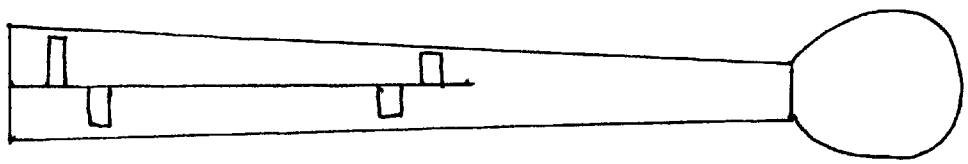

FIG. 67C is a top view of the reflective foil in FIG. 67A showing the nubs.

Figure 67D:
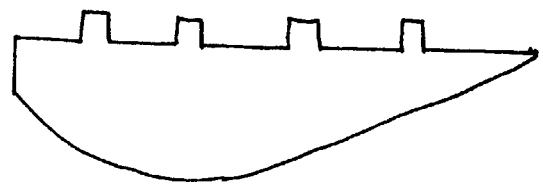

FIG. 67D is a side view of a reflective foil, showing the numbs before they are creased or folded.

Figure 70:

FIG. 70 is a side view of a preferred shape of the reflective foil. Notches 395 can be placed along the top of the reflective foil. Rigid or semi-rigid material 331, 340 of the size shown in FIGS. 58–59 can be placed into the notches in the reflective foil and serve to keep the reflective foil in a desired position within the lure.

FIG. 71 is a side view of a preferred shape of the reflective foil. Two or more holes 396 can be placed in the reflective foil which allow for rigid or semi-rigid material, as shown in FIG. 58, to be placed into the holes and keep the reflective foil in a desired position within the lure.

Figure 72:
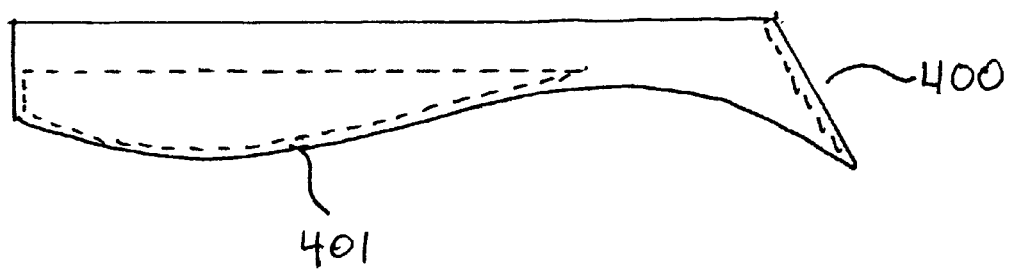

FIG. 72 is a side view of a preferred embodiment of the fishing lure. Reflective foils 400, 401 are placed within the lure or on the outside surface of the lure's sides. The reflective foil 400 in or on the tail of the lure is approximately the same size as the tail of the lure itself, when viewed from the rear of the lure. The reflective foil size and shape is preferred embodiment of the fishing lure. However, the invention encompasses all reflective foil shapes that can fit onto or within soft flexible fishing lures and those soft flexible fishing lures that are shaped like fish or imitate fish.

Figure 73:
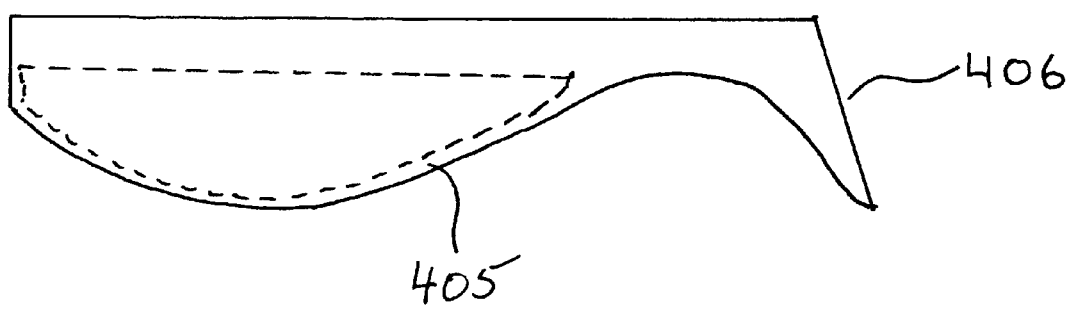

FIG. 73 is a side view of a preferred embodiment of the fishing lure. Reflective foils 405, 406 are placed into the lure or on the outside surface of the lure's sides. The reflective foil size and shape is a preferred embodiment of the fishing lure.

Figure 74:
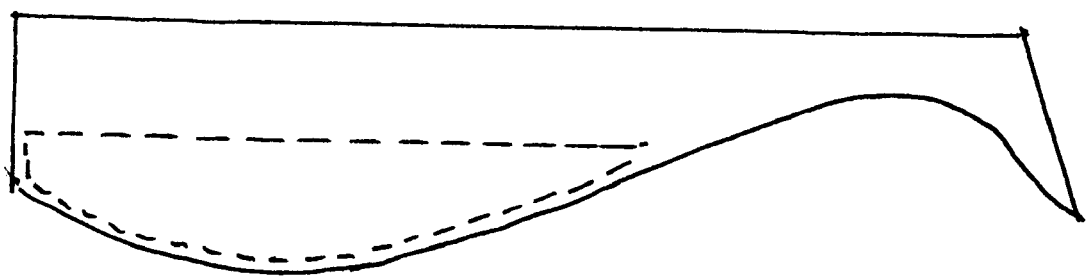

FIG. 74 is a side view of the preferred embodiment of the fishing lure shown in FIG. 1. In the drawing, a dashed line represents a smaller soft flexible lure inside the preferred embodiment. This smaller soft flexible lure can be made in any desired shape. Reflective foil with an adhesive backing is applied to both sides of the smaller lure. A small amount of clear or semi-transparent heated plastisol is then poured into the larger lure's mold cavity and then the smaller lure is placed into the heated plastisol inside the larger lure's mold cavity. The remainder of the mold cavity is then filled in with plastisol to finish the lure. This results in a soft flexible lure with the reflective foil shining through the clear of semi-transparent plastisol of the outer casing of the lure. See FIG. 39T for a front view of this embodiment.

Figure 75:
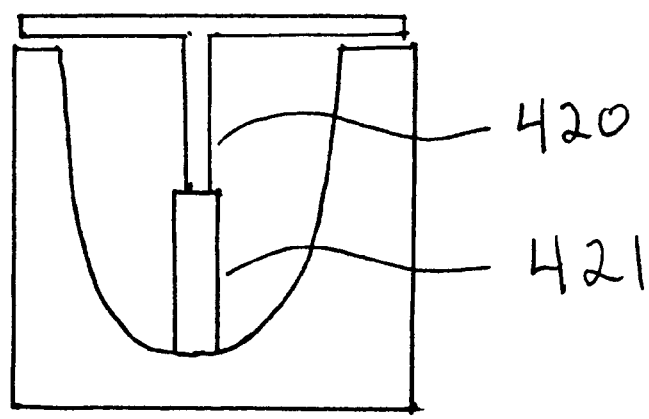

FIG. 75 is a front view of the mold and mold cavity. A bracket is shown that has an arm 420 coming down which splits into two appendages 421. A dashed line represents the reflective foil. The two appendages serve to keep the reflective foil in a desired position in the mold cavity.

Figure 76:
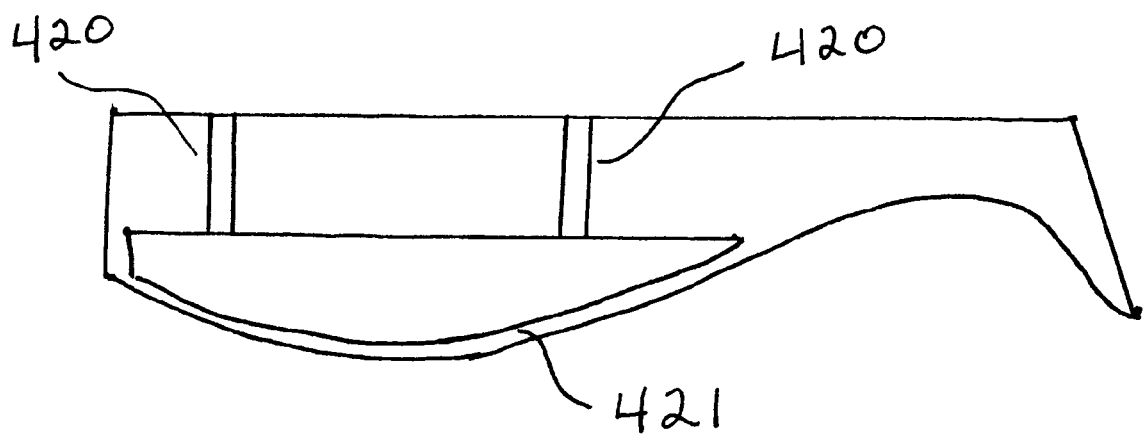

FIG. 76 is a side view of what the bracket in FIG. 75 would look like. The two arms 420 are attached to the appendages 421. The appendage 421 is shaped to match the approximate shape of the reflective foil.

FIG. 80 is a side view of the lure shown in FIG. 2. Two protrusions 450 are shown. These protrusions are part of the mold cavity and are placed in the middle of the lure. The protrusions serve to keep the reflective foils from toppling over within the mold cavity.

FIG. 81 is a side view of the lure shown in FIG. 2. Two points 460, 461 are shown which represent a preferred distance of the slit along the belly of the lure that is described at FIG. 42. The slit along the belly of the lure may run any distance along the lure, however, this is a preferred distance.

SUMMARY OF THE INVENTION

The subject invention is of any soft plastic fishing lure with a large piece or pieces of reflective foil or reflective material, placed into the lure, or onto the outside surface of the lure. The reflective material, hereinafter called reflective foil, is of a larger size than the glitter used in prior art. Prior art used glitter sizes up to 0.040 inch dispersed into the plastisol, although some limited colors of glitter are available in sizes to 1/8 inch. The reflective foil, in the preferred embodiment, is of any highly reflective foil or reflective material. Examples include embossed metallized polyester film, holographic metallized polyester film, holographic polyester film, polyester film, polyester and aluminum glitter, Polyvinyl chloride aluminum/metal foils, holographic foils, polyester and metal flake, etc. The reflective foil often has a pattern in the material, such as fish scales, or small dots. The reflective foil may have an adhesive coating applied to one side. Additionally, it can be coated with a non-adhesive coating. The coating, among other things, protects the reflective foil from chemicals, heat, scratching, etc. The coating can also be of a transparent color that imparts color to the reflective foil. Transfer Print Foil and The Witchcraft Company are two of many companies that provide such reflective foil. The reflective foil, larger than the size of glitter, creates a more brilliant reflection than what was available through prior art. The reflective foil can also have an image or likeness of any fish or bait or an art design. Said image, likeness, or art design can be placed into or onto the reflective foil by any suitable means. Examples include embossing, hot stamping, pad printing, painting, air brushing or printing.

In prior art, soft bodied lures have used very small pieces of glitter or reflective pigments, to achieve reflection of light in the lure to imitate the brilliant reflection of the scales and skin of fish. However, glitter does not produce near the reflective qualities as that produced by a large strip of reflective foil. Glitter is interspersed throughout the plastic lure and thus does not have near the same amount of surface area with which to reflect light. Also, the small pieces of glitter that are randomly interspersed throughout the lure in prior art do not all face the same direction, and thus the total surface area of the glitter that reflects in a particular direction is much less than a lure with a larger piece of reflective foil. Additionally, the use of glitter to achieve reflection prevents the use of a "pattern" such as fish scales to be seen in the lure. Glitter is of such small size, does not face the same direction, and does not have the continuous surface area and thus cannot match the amount of reflection of a larger strip of reflective foil.

A piece of reflective foil that is much larger than the size of glitter, has greater surface reflection area and much greater reflection than glitter. Consequently, a much better imitation of the natural reflection of a fish's skin and scales is achieved. The piece of reflective foil also has the advantage in that the reflective foil can have a pattern, such as fish scales or other patterns. Thus, the invention achieves an improved or different reflection and a better imitation of fish that was not available in prior art. Through use of holographic images, the pattern in the reflective foil is highly visible, even at extreme angles. This improved reflection is achieved whether the reflective foil is embedded in the lure or applied to the outside surface of the lure.

Hard plastic baits have used reflective foil inserts in them for decades. The hard plastic baits are normally made of two hollow halves. The foil is placed inside the two hollow halves and then the two parts are welded together. Various reasons can be given as to why no one has invented a soft plastic bait with a large piece of reflective foil inside the lure or placed on the outside of the lure. The first being that the idea was never thought of since the glitter already being used in prior art provides a source of reflection. Also, the reflective foil most commonly used in the fishing industry has an adhesive backing. Few persons are aware the foil can be coated with a thin clear non-adhesive coating instead of an adhesive backing. Even if the idea had been thought of, barriers needed to be overcome to build the lure. Questions would need to be answered such as would the plastisol bond to the foil when the plastisol is poured into the mold! How would the foil react to the high heat of the plastisol when it is poured into the mold! Would the foil disrupt the flexibility and action of the soft plastic lure, especially the paddle tail baits which have an oscillating action where the rear third to half of the lure oscillates! Those manufacturers who make soft plastic baits often do not manufacturer the hard plastic baits, and so may not have been aware that the reflective foil was available. Additionally, production techniques needed to be mastered to be able to make a soft plastic lure with a large reflective piece of foil in them. How would the foil be kept in a desired position in the mold cavity! Since the plastisol is of a heavier material than the foil, what would keep the foil from being moved out where the reflective foils are not in fairly consistent position within the lure. What thickness of foil should be used, since too think of a foil tends to curl from the high heat and weight of the plastisol.

Too thick of a reflective foil causes the action of the soft plastic lure to be diminished. A new way needed to be determined to inset a hook into a soft plastic lure which has a reflective foil strip in it. The reflective foil will bend from side to side. However, it will not bend in an up and down direction. The lure in FIG. 1 shows how this lure is rigged by fishermen, with the hook protruding out of the top or back of the lure. The lure is threaded onto the hook by inserting the hook into the middle section of the nose or front of the lure and threading it on, and then pushing the hook point out the top or back of the lure. This technique could not be done with the same lure if it had a large piece of reflective foil in it since the reflective foil could not bend around the bend in the hook. The inventor has solved this problem by turning the lure onto its side and inserting the hook at the same point as previously described, only the lure is turned 90 degrees. This allows the foil to bend in a side to side manner when the lure is threaded around the bend in the hook, rather than an up and down manner. Once the hook is threaded far enough on the hook for the lure to hang straight, the lure is rotated back 90 degrees and the hook pushed out the top or back. Finally, in the embodiment where the foil is placed onto the outside surface of the lure, a technique needed to be developed to bond the reflective foil to the soft plastic lure. The problem is that the reflective foil has a very slick surface which is extremely difficult to bond to. This barrier had to be overcome in order to manufacture a soft flexible lure with reflective foil bonded to the outside surface.

DETAILED DESCRIPTION OF THE INVENTION

The invention is of reflective foil larger than the size of glitter, placed onto the outside surface of soft flexible lures, or placed into soft flexible lures. The preferred embedments are shown in FIGS. 1–15. The lures in FIGS. 1–23 are called swimbaits. Swimbaits imitate baitfish. The lures in FIGS. 1–10 are also called paddle tails due to the large tail on these lures. The preferred tail shapes are shown at FIGS. 38C and 38B. The preferred shape when viewed from the front of the lure are FIGS. 39K, 39A, 39H, 39Q and 39R. Most of the preferred embodiments are shown in FIG. 1. The soft flexible lures of this invention can be made of any suitable material. One such material is plastisol. The lures may range in size from one-half inch to over 14 inches. The most frequent sizes are two to nine inches. Molds for the lures can be made of any suitable material. Casting resin and RTV silicone are two such materials. The plastisol can be poured or injected into the mold in the clear state the plastisol comes in, or it may be poured or injected with a coloring added to the plastisol. Glitter and other materials can also be added to the plastisol. Oils and scents can be added in or on the lure or the tail of the lure to attract fish by sound. MF Manufacturing, located in Texas, is one of many companies that supplies such plastisol, mold making material, dyes, pigments, coloring, glitter, and scents.

There are essentially five ways that the reflective foil is placed into or onto to the lure.

The first method is to adhesively bond the reflective foil onto the surface of the lure. After the soft flexible lure is made, the reflective foil can be placed by any suitable means onto the outside surface of the lure in the desired positions. One preferred method is to create an indented area on the lure that is the same shape as the reflective foil. This allows for a quicker and easier bonding process. Plastisols tend to break down most adhesives. Additionally, The surface of the reflective foil and soft plastic lure are very smooth. Both of these situations creates a difficult bond. Cyanoacrylate adhesives with their associated accelerators have been found to provide a decent bond. Epoxies, and other adhesives can also be used. A rubber based adhesive sealant polymer such as Norstic 160 is also a good adhesive for the two parts. However, the cyanoacrylate adhesive allow for a quick manufacturing process. It is also advantageous to leave the surface of the lure where the reflective foil will be applied rough, and not smooth. This may be done by making a mold that has a rough surface where the reflective foil will be adhesively bonded. If the first attempt fails to bond, the inventor has found that if a second coat is then applied and the parts are then pressed together, a suitable bond will occur. Under this method it is advantageous to sand one side of the reflective foil so that it will form a better bond. If this is not done, the bond will be very poor. In order to sand the reflective foil, the reflective foil must have a coating on it. Otherwise, sanding the metal foil itself will rub away the metallic foil and the reflection will be harmed.

The second method is to embed the reflective foil into the soft flexible lure. This is achieved by placing the reflective foil into the mold prior to, during, or shortly after the plastisol is poured into the mold, but before the plastisol hardens. In this method, a means is normally, but not always needed, to keep the reflective foil(s) in a desired position in the mold or lure. One of the problems in making the lure under this method is that if the reflective foil is placed into the mold right after the plastisol is poured, the reflective foil tends to bend and twist from the heat of the plastisol. It has been bound that one preferred technique to prevent this is to fill the mold part way, and then wait a predetermined amount of time to let the plastisol cool some before placing the reflective foil into the plastisol in the center of the mold. However, waiting too long will allow the plastisol to cure past a liquid state and the reflective foil cannot be placed into position. After the reflective foil is placed into the mold cavity, the remaining plastisol is poured to fill out the mold cavity. Another preferred method is shown at FIGS. 75 and 76 where a bracket, of about the same size as the reflective foil, sandwiches the reflective foil. The plastisol is poured into the mold up to the top of the reflective foil. The bracket is removed after a predetermined amount of time. Removing the bracket too soon will allow the heat to curl the reflective foil. Removing the bracket too late allows the plastisol to cure too much. This second method is a preferred method.

The third method is to bond the reflective foil to the outside surface of the lure by sanding the clear coating on one side of the reflective foil, placing the reflective foil up against the side of the mold cavity, and then pouring the plastisol into the mold. The sanding of the reflective foil's clear coating roughens the surface and allows for a greater bond with plastisol. If the sanding is not done, the bond will be very weak and the reflective foil will peel from the lure. By placing the reflective foil against the sides of the mold cavity, the reflective foil will form the outside surface of the finished lure. It is advantageous to sand the reflective foil in more than one direction to create a better bond. This allows the heated plastisol to fill into these small scratches and form a good bond. This is a preferred method.

The fourth method is to create two molds. One the exact shape of the finished lure, the other a smaller size, usually the shape of the reflective foil. The smaller size mold is cast first. The reflective foil is then placed onto the sides of this casting, using either adhesively backed reflective foil, or applying an adhesive to the reflective foil and mating the two parts together, or using the method described under three above. Some plastisol is poured into the larger lure mold, the smaller size casting with the reflective foil is placed into the larger mold, and then the remaining plastisol is poured to fill out the mold cavity. In essence, a cured piece of soft flexible plastisol with reflective foil is being embedded into a soft flexible lure. FIGS. 74 and 39T represent this method.

The fifth method is to pour plastisol into the mold and then pour it out quickly. This will leave a thin amount of uncured plastisol on the sides of the mold cavity. Reflective foil can then be placed against the sides of the lure cavity. The uncured plastisol will hold the reflective foil in place, and then the mold is filled with plastisol.

The reflective foil material can be obtained from many manufacturers. The Witchcraft Tape Products Inc. company supplies such reflective material as does Transfer Print Foils. The scope of the present invention is all sizes, patterns and shapes of reflective foil that can fit into or onto the bodies of soft flexible lures, as well as all angles that the reflective foils can be placed into or onto the lures. The preferred shapes of the reflective foil are shown at FIGS. 1, 5 and 7.

The reflective foil is generally made of embossed polyester film, prism film or tape, pad printed film or tape, aluminum/polyester foils, polyesters, polyester flake, metallized polyester film, holographic foils and films, holoform, metal and polyester flake and the like. Holoform is a new product from the previously named Witchcraft Company. The reflective foils often have a design in them, such as fishscales or other designs, which adds additional optical effects. These patterns are often called holographic or diffraction patterns. The term reflective foils includes any material that has reflective characteristics of the above described metallized polyester film. The reflective foils may also include the design of any fish, bait, or artistic design imprinted in the reflective foil, such as threadfin shad, squid, crawdad, shiners, anchovies, mackerel, sardines, chubs, trout, bass, pilchers, smelt, grunion, herring, perch, minnows, etc. The reflective foil may have a pattern, such as fish scales, dots or other patterns. The foil companies offer numerous patterns on the reflective foil. The previously named Witchcraft Company has introduced a new product called Holoform. The Holoform comes in various reflective colors and patterns. What is unique about the Holoform is that the reflective holographic foil is not necessarily continuous, but can be deposited in a specific pattern, such as fish scales. Additionally, the holoform reflective foil can be deposited in the design of a baitfish or artists drawing of a baitfish or other bait. This allows the color of the lure behind the holoform to be seen through the gaps in the reflective foil pattern. The reflective foil is normally of one particular design and/or color, however one or more additional reflective strips can be placed into or onto the lure or onto another strip of reflective foil. For instance a piece of blue reflective foil can be applied to the upper half of a silver prism foil to create the effect of a silver prism lower portion, or belly of the lure, and a blue prism midsection of the lure. The same effect can also be achieved by using transparent colored plastisol in various layers of the lure. Additionally, the reflective foil can be comprised of more than one color. The reflective foil may also have eyes placed on it. The eyes may be two dimensional or three dimensional. The previously named Witchcraft Company makes such eyes.

FIG. 1 shows a perspective view of a preferred embodiment of the fishing lure. The lure has a front or nose 1, a back or top 2, a belly or bottom 3, and a tail 4. FIG. 2 is a top view of the same lure in FIG. 1, with the sides 5 and 6, identified. FIG. 3 is a top view of the same lure. Although the lure in FIG. 1–3 has a flat front to it, the front of the lure may be shaped in numerous configurations, including a rounded or pointed front or nose. See FIGS. 9–14 and 35 and for examples of a rounded or pointed nose. The thickness of the lure, when viewed from front to rear, generally tapes from the front 1 to the tail 4 as shown in FIG. 2. However, this is not a requirement. The lure also tapers from the belly 3 to a point just prior to the tail 4 when viewed from the side. The tail 4 is larger or heavier or both, than the preceding section of the lure. The tail shape is not limited to the shape in FIGS. 1–3. Any tail shape that causes the lure, or any portion of the lure, to have an oscillating motion, or a side to side movement is within the scope of the present invention. The number of shapes that produce such action is too great to draw to list. However, some examples are shown in FIGS. 38A–38J. The lure may be shaped in any configuration when viewed from the front 1 to the tail 4 of the lure. Some examples of such shapes are shown in FIGS. 39A–39T. However, the present invention is not limited to the shapes cited, since many variations are possible. Reflective foil 8 is placed onto the outside surface of the lure or within the lure. The reflective foil can be any reflective material which is larger than the size of glitter common to prior art, which is ⅛ of an inch. Examples of such materials are aluminum/metallized foils, metallized polyester film, holoform, holographic mettalized film, etc. The reflective foil can also have an art design, or image or likeness of any fish or bait placed by any means on the reflective foil. Examples of placing an image, likeness or art design on or in the reflective foil or on the lure include embossing, hot stamping, pad printing, painting, air brushing, printing, or engraved or designed into the lure itself. The reflective foil shape can be of any possible shape that can fit on or within the lure. Preferred shapes are shown at FIGS. 1, 5 and 7. However, the present invention is of all shapes that can possibly fit within or on soft flexible lures. The reflective foil can be placed at any angle within soft flexible lures.

In the fish shaped or fish imitating soft flexible lures that are commonly called paddle-tail baits, FIGS. 1–10, reflective foil can also be embedded in the large tail section or placed onto the back outside surface of the tail section. When placing a large piece of reflective foil into the mold of a paddle-tail swimbait it is preferable to have a tail shape that is as wide or wider at the top of the tail compared to the lower parts of the tail. Examples of such shapes are shown at FIGS. 38B, 38C, 38F, 38G and 38H. The reflective foil in the tail causes greater reflection than glitter. A preferred embodiment for the reflective foil for the paddle tail section of the lure is shown in FIGS. 1 and 38C. In FIG. 1, reflective foil is placed into or onto the large tail section of the paddletail lures. This also causes the tail to be stiffer than if no reflective foil were in the tail. The foil can be placed into or onto the tail by any of the methods described previously. The tail, if desired, can be poured with clear plastisol so that the reflective foil shines in both directions.

When embedding the reflective foil into the lure, rather than on the outside of the lure, various methods and means can be used to keep the reflective foil in the desired position within the mold cavity prior to pouring the liquid plastisol into the mold. Many of these methods are based upon the drawings in FIGS. 40–71. It is not possible to list all of the means for keeping the reflective foil in a desired position within the lure, but the following ways ware noted. The preferred method is to create a bracket as shown at FIGS. 75 and 76. Another preferred method, is to create a bracket with a slightly different configuration, that sits on top of the mold and has one or more protrusions or arms that stick down into the mold. FIGS. 61A–61F are examples of such brackets. The arms sandwich the reflective foil(s) and keep the reflective foil(s) within a desired position. The bracket can be removed from the mold prior to, or after the plastisol cures. Another method is to create slits in the mold adjacent to the nose and tail of the swimbait lure and run a wire, fishing line, or other article through the slits and mold cavity. The reflective foil would be kept in place by the article. The article can be removed prior to the plastisol curing if desired. Another method of keeping the reflective foils in a desired position is to apply small drops of hardened resin to the reflective foil at various points. The Witchcraft Company makes three dimensional eyes using a hard resin. The resin is deposited over a reflective foil. These eyes can be made with or without an adhesive backing to them. The three dimensional eyes can be made without the black pupil in them. These drops or three dimensional eyes can be stuck on to the reflective foil at desired points. If the reflective foil leans to the side of the mold cavity, the hardened resin will rest against the side of the mold cavity and not the reflective foil. The reflective foil may have a device attached or holding the reflective foil, which keeps the reflective foil in a desired position within the lure and lure cavity. One examples of such a device is a clip, very similar to a hairpin, into which the reflective foil is placed. The clip also has two arms protruding away from each other that would butt up or nearly butt up against the sides of the mold cavity. When the hot plastisol is poured into the mold cavity, the two arms extending outward from the clip, would hold the reflective foil in place and prevent it from toppling or leaning to one side. Another example is shown in FIG. 49 where the reflective foils are adhesively placed onto a rigid or semi-rigid structure. The structure is made to fit inside the mold cavity and the plastisol is poured around the structure. The structure can be made to accommodate any desired foil shape(s) and angle that the foil is placed into the lure. Another way of keeping the reflective foil in a desired position is to make a form that is of approximately the same shape as the reflective foil when viewed from the side of the lure. The form can be made of any desirable material. An adhesively backed insert is then applied to either side of the form. The form is then placed into the mold and the plastisol is poured around or between the form. This process essentially encapsulates another form within the lure, and this form has the reflective foil on it. Another method is to create a mold with a slit in the mold material adjacent to the lure cavity, preferably at the front or nose of the lure. The reflective foil can be placed into the mold cavity with part of the reflective foil being placed into the slit in the mold. This serves to hold the reflective foil in a desired position. After the lure is made the protruding section of the reflective foil can be cut off. Another method of placing the reflective foil into a desired position is to create a mold so that the portion of the lure that will have the reflective foil in it is divided into two halves or sides. This can be done by creating a lure with a slit in the lure running along the belly of the lure from front to rear, in the shape of the desired insert. After the soft flexible lure is made, an insert can be placed into the slit area of the lure and then the belly of the lure can be sealed through heat sealing, stitching, adhesion, or any other means. Another method of keeping the reflective foil in a desired position is shown at FIGS. 48–49 where a tiny hole is made in the reflective foil through which a small piece of rigid or semi-rigid material is placed, similar to a toothpick. The "toothpick" should be almost the width of the lure cavity. This will serve to balance the reflective foil in the mold cavity. Still another method is to put very small nails or other similar items into the mold and up through the belly of the lure cavity. The nails should be placed at about the width of the reflective foil apart from each other. The reflective foil can be placed between the nails which will serve to keep the reflective foil in place. Another method is to use nodes and protrusions as described in FIGS. 41–57. Also a wire(s), fishing line(s) or similar item may be placed lengthwise in the mold to keep the reflective foils in a desired position. The fishing line or wire can be removed prior to the plastisol hardening. Another method is to put a crease in the top edge of the reflective foil and fold it toward the sides of the lure. See FIG. 67B for an example. Another method is to create some "nubs" at the top edge of the reflective foil. The nubs can be folded toward the sides of the mold cavity so that when placed into the mold, the numbs will point towards the sides of the mold cavity, and thus keep the reflective foil from toppling over within the mold cavity. See FIG. 67D for an example. Other methods of keeping the reflective foil(s) in a desired position are shown and described at FIGS. 40–72. Other methods to hold the reflective foil(s) in a desired position will become obvious to those knowledgeable in the art.

The lure may also have eyes, nose, mouth, fins, plates, and gill plates designed in the surface of the lure, or placed on the reflective foil. It is not possible to draw every conceivable lure embodiment with eyes, nose, fins, etc. Accordingly, the scope of the invention should not be determined by the embodiments illustrated, but by the spirit of the invention and the appended claims and legal equivalents. FIG. 64 is an embodiment for the placement of three dimensional eyes in the lure. The eye socket may also be indented in the surface of the lure, as opposed to FIG. 64 where the eye socket extrudes from the lure. When the eye socket is indented, the three dimensional eye can be placed into the indented area and then glued, heat sealed, or adhesively bonded in the eye socket. Further, the cured plastisol in the eye socket can be heated with a small torch and then a three dimensional eye placed into the eye socket. Additionally, stick-on reflective eyes from the previously named Witchcraft Company can be placed on the reflective foils and then the reflective foil embedded into the plastic lure or placed onto the outside surface of the lure.

After the lure is made, the lure normally is attached to a weighted hook, known as a jighead or jighead jig, with the weighted portion of the hook located adjacent to the front or nose of the soft plastic lure as shown in FIG. 1. The jighead may be of various shapes and sizes depending on the fishermen's choice. Additionally, the soft flexible lure may be cast attached to a jighead jig or weighted hook on unweighted hook. FIGS. 36A–36C show a mold cavity designed to mold a soft flexible lure to a jighead. The jighead may also be placed inside the lure, prior to the plastic curing. In order to mold a jighead or weighted hook inside a soft flexible lure, device or means must be used to keep the jighead and hook, or weighted hook in a desired position. Various brackets and clamps can be made for such purposes. See FIG. 63 for one such example where a pin can be inserted through the eye of the hook of a jighead jig. FIG. 36B shows a plate 166 with a groove 167 in it that can be placed adjacent to the front of the lure for purposes of molding a hook, or weighted hook to the soft flexible lure. The entire lure as shown in FIG. 1 oscillates to some degree. Additionally, the rear third of the lure oscillates significantly due to the large paddle tail. Increased oscillation may be obtained by means of an attached jighead that oscillates, or oscillate through other devices which can cause the lure to oscillate as the lure moves through the water. One such shape is identified under U.S. Pat. No. 4,790,101. An example of an oscillating jighead is identified under U.S. Pat. No. 3,729,850. A better method for an oscillating jighead is shown at FIGS. 29A–C. The advantage of the jighead in FIGS. 29A–C is that the component causing the oscillating effect is molded into the shape of the jighead. Prior art generally glued the component causing the oscillation onto the jighead. This is a time consuming task. Molding a jighead with the oscillating action built in saves time an cost in manufacturing a jighead with oscillating ability. The oscillating effect causes greater reflection in the lure when combined with the reflective foil. The lure may also be weighted by other means such as weights on the fishing line, weighted hooks or jigheads inserted or molded into the lure, and weights inserted or molded into the lure. The lure may also be fished without weight. Hooks may be inserted into the lure or attached to the lure, in any way the fishermen chooses. Eyes may be placed onto the jighead. Hooks can be placed into the lure in desired positions, prior to or during the curing of the plastisol.

The body of the lure may be of a smooth surface, or it may have a scale or other effect in the surface of the lure. The scale effect may be shaped like fish scales, or may be shaped numerous ways such as diamond shaped, triangular shaped, square shaped, rectangular shaped, oval shaped, elliptical shaped, circular shaped, or polygon shaped. The lure may also have a pimpled effect in the surface of the lure. Additionally, the lure may have either vertical, horizontal, or diagonal cuts or lines in the surface of the lure. The small vertical, horizontal, and diagonal lines may be combined in any combination on the surface of the lure in any pattern and at any distance apart. These "scales" and lines in the surface of the lure serve to create additional optical effects for the soft plastic lures with embedded reflective foil.

The lure may be made of clear plastic, or it may be colored. Additionally, the lure may be produced with as many as colors as desired. The coloring can range from transparent to opaque. If transparent colors are used, such as a blue transparent color, it will make a silver reflective foil appear to be blue reflective foil small reflective particles, such as glitter, may be added to the clear or colored plastic. Oils and scents can be added to the plastic to better attract fish. A rattle can also be inserted or attached to the lure or in or on the tail portion or the rear third portion of the lure to attract fish by sound. As the lure oscillates, the rattle will make a noise which has been shown to attract fish.

The lure can also have a small light emitting device placed in or on the lure. The light emitting device can be activated by various means to those knowledgeable in the art. The light emitting device causes light to be shined upon the reflective foil and thus creates reflection. This is especially advantageous in deeper water where light does not penetrate well or on cloudy days when there is not much available light.

Highly buoyant material, such as Styrofoam, may be placed into the tail section to cause the tail to float. This situation is preferable when fishing near the bottom and the lure is weighted at the head.

The embodiments and features of the embodiments shown in FIGS. 1–81 may be combined in any desirable combination. Additionally, the tail shape of the paddletail lures, FIGS. 1–10, may be shaped in any configuration, so long as the shape or size of the tail causes the paddletail to oscillate FIGS. 1–23 and 35 are called swimbaits. Swimbaits are soft plastic lures designed to imitate by shape or action, the baitfish that gamefish feed upon. Swimbaits do not necessarily require a paddletail. Additionally, any swimbait with a large tail section that causes the tail to oscillate is called a paddletail or paddletail swimbait. It is not possible to draw and described every conceivable swimbait or paddletail embodiment. The scope of the present invention is of all swimbait and paddletail lures to which reflective foil, larger than the size of glitter, is embedded into or placed onto the lure. Accordingly, the scope of the invention should be determined not be the embodiments illustrated, but by the appended claims and their legal equivalents.

OTHER EMBODIMENTS

FIG. 4 is the same lure as the lure in FIGS. 1–3, except with a rectangular or square shaped paddletail.

FIG. 5 is the same lure as the lure in FIGS. 1–3, except with a much larger paddletail.

FIG. 6 is the same lure as the lure in FIGS. 1–3, but with a slimmer body.

FIG. 7 is the same lure as the lure in FIGS. 1–3, but with a much deeper belly.

FIG. 8 is the same lure as the lure in FIGS. 1–3, but with a much thinner pre-tail section and with a thinner-paddletail. This thinner pre-tail section combined with the paddletail causes the lure to oscillate better at slower retrieval speeds.

FIG. 9 is the same lure as the lure in FIGS. 1–3, except with a rounded or pointed nose.

FIG. 10 is the same lure as the lure in FIG. 9, except with top portion of the lure not being flat, but curved at various points.

FIGS. 11–15 are called swimbaits. Generally, they have a slimmer profile than the paddletail lures. FIG. 22 shows the shape of these lures when viewed from the top.

FIG. 16 is of a similar shape as FIG. 1, but with a single curl tail instead of a paddletail.

FIG. 17 is of a similar shape as FIG. 1, but with a double curl tail instead of a paddletail.

FIGS. 20A and B show a swimbait called a Reaper. The preferred reflective foil shape is shown by the dashed lines at FIG. 20A.

FIGS. 21 and 22 show a swimbait often called a jerkbait.

FIG. 23 is a top view of a swimbait. The lures in FIGS. 1–22 can be shaped as shown in FIG. 23. The asymmetrical sides of the lure shown in FIG. 23 provide a swimming or oscillating motion without the use of a paddletail at the end of the lure. Consequently, the lure can be shaped with a thin tail, more representative of baitfish.

FIGS. 24A and 24B are called a shrimp tail. The lure is designed to imitate shrimp.

FIG. 28 is an imitation of a crawdad.

FIG. 30 is a lure in the shape of a lizard.

FIGS. 31 and 32 are known as a pork frog or jig trailer. The dashed lines represent a preferred shape for the reflective foil.

FIGS. 33 and 34 are meant to resemble a squid. The dashed lines represent a preferred shape for the reflective foil.

FIG. 35 is a top view of a swimbait with a rounded nose. All of the paddletail swimbaits in FIGS. 1–10 cam be made with a rounded nose.

OPERATION OF INVENTION

The paddle shape of the tail in FIGS. 1–10causes approximately the rear third to half of the lure to oscillate, or move side to side, as the lure is moved through the water. This imitates the swimming motion of fish. The entire lure also exhibits a rolling or oscillating motion caused by the paddle tail. The reflective foil embedded within the lure, or placed on the surface of the lure, attracts fish by means of a brilliant reflection. The reflective foil can also attract fish by means of an art design, placed into or onto the reflective foil or onto the lure. The reflective foil within the lure also attracts fish by means of an image or likeness of any fish or bait, placed into or onto the reflective foil or onto the lure.

The lures in FIGS. 1–23 imitate the appearance of baitfish or bait and are classified as swimbaits. The reflective foil within or on the lure attracts fish by means of a brilliant reflection. The reflective foil within the lure can also attract fish by means of an art design, placed into or onto the lure. The reflective foil within or on the lure also attracts fish by means of an image or likeness of any fish or bait, placed into or onto the reflective foil or onto the lure.

The lures in FIGS. 24–34 imitate the appearance of various baits. The tails and legs undulate and attract fish. The reflective foil within or on the lure attracts fish by means of a brilliant reflection. The reflection foil within or on the lure can also attract fish by means of an art design, placed into or onto the reflective foil or onto the lure. The reflective foil within or on the lure also attracts fish by means of an image or likeness of any fish or bait, placed into or onto the reflective foil or onto the lure.

CONCLUSION

The reader can see by the description and the actual invention with this application that the present invention produces a vastly greater reflection in soft bodied lures than was previously known. The reflective foil, much larger than the size of glitter, placed on the surface of the lure, or embedded in the lure, produces greater reflection than the prior arts' use of glitter. Additionally, the large piece of reflective foil can have patterns designed into the foil, such as fish scales, which further enhances the likeliness of the lure. The prior arts' use of glitter prevented any reflective pattern other than the random sparkle created by the individual pieces of glitter.

While my above description contains many specificities, these should not be construed as limitations on the scope of the invention, but rather as an exemplification of the preferred embodiments thereof. Many other variations are possible. Accordingly, the scope of the invention should be determined not by the embodiments illustrated, but by the appended claims and their legal equivalents.

What is claimed:

1. A method for adhering reflective material selected from the group consisting of reflective foil, embossed foil, polyester, embossed film, mettalized film, embossed mettalized film, holographic foil and holographic mettalized film to a soft flexible lure, wherein the reflective material normally has a coating or film;

a film selected from the group consisting of polyester and polyvinyl chloride;

wherein the film being on one side of the reflective material is roughened, by sanding, and then placed within a lure's mold cavity and against a surface of a mold cavity with the roughened side of the reflective material facing the lure;

wherein material for making a soft flexible lure, being plastisol, is then poured or injected into the mold to fill the mold cavity;

whereby the cured plastisol forms a bond with the reflective material;

whereby a soft flexible lure is produced with reflective material adhered to the surface of a soft flexible lure, which provides reflective qualities in soft flexible lures.

2. A soft flexible lure simulating fish or bait formed by the method recited in claim 1;

said lure having top, bottom, side, front and rear surfaces;

said lure with reflective material adhered to the surface of the lure;

said reflective material selected from the group consisting of foil, embossed foil, holographic foil, embossed film, mettalized film, holographic mettalized film, embossed mettalized film, colored films and reflective films;

said lure with means for adhering the reflective material to the surface of the lure.

3. A fish lure as recited in claim 2;

said lure simulating a swimbait.

4. A fish lure as recited in claim 2;

said lure with a fishing hook or jighead placed within or through the lure, or placed wholly or partially within the lure itself, or attached to the lure, or molded within the lure.

5. A fish lure as recited in claim 2;

said lure with a design or pattern visible in the reflective material.

6. A fish lure as recited in claim 2;

said lure simulating a jerkbait.

7. A fish lure as recited in claim 2;

said lure simulating a reaper.

8. A fish lure as recited in claim 2;

said lure simulating a squid, lizard, crawdad or jig trailer.

9. A fish lure as recited in claim 2;

said lure with a sound making device placed within or on the lure.

10. A soft flexible lure simulating fish or bait;

said lure with reflective foil embedded within the lure;

said reflective foil greater than 0.25 inch in length or width;

said reflective foil selected from the group consisting of foil, embossed foil, holographic foil, embossed holographic foil, mettalized film, embossed film, and holographic mettalized film;

said lure with means for embedding the reflective foil in the lure in a predetermined location within the lure.

11. A fish lure as recited in claim 10;

said lure simulating a swimbait or jerkbait.

12. A fish lure as recited in claim 10;

said lure simulating a squid, lizard, crawdad or jig trailer.

13. A soft flexible swimbait lure formed by the method recited in claim 1;

said lure with top, bottom side, front and rear surfaces;

said lure with reflective material adhered to the surface of the lure;

said reflective material selected from the group consisting of foil, embossed foil, holographic foil, embossed film, mettalized film, holographic mettalized film, embossed mettalized film, color films and reflective films;

said lure with means for adhering the reflective material to the surface of the lure.

14. A soft flexible paddletail lure;

said lure with reflective material embedded in the tail of the lure;

said reflective material is greater than 0.25 inch in length or width;

said reflective material selected from the group consisting of polyester, embossed film, foil, embossed foil, holographic foil, mettalized film, embossed mettalized film, and holographic mettalized film.

15. A fishing lure as recited in claim 14;

said lure with a sound making device placed in the lure or attached to the lure.

16. A soft flexible paddletail lure formed by the method recited in claim 1;

said lure having top, bottom, side, front and rear surfaces;

said lure with reflective material adhered to the surface of the lure;

said reflective material selected from the group consisting of polyester, embossed film, foil, embossed foil, holographic foil, mettalized film, embossed mettalized film, and holographic mettalized film;

said lure with means for adhering the reflective material to the surface of the lure.

17. A fishing lure as recited in claim 16;

said lure with a simulated fish body and a tail;

said tail with two or more surfaces;

said lure with reflective material adhered to one or more surfaces of the tail of the lure.

18. A fishing lure as recited in claim 16;

said lure with a simulated fish body and tail;

said lure tapers as it nears the tail of the lure;

said tail is wider or taller or wider and taller than the immediately preceding tapered portion of the lure.

19. A fishing lure as recited in claim 16;

said lure with a sound making device placed in the lure or attached to the lure.

* * * * *